US012264032B2

(12) United States Patent
Suzuki et al.

(10) Patent No.: US 12,264,032 B2
(45) Date of Patent: Apr. 1, 2025

(54) MEDIUM PROCESSING APPARATUS AND IMAGE FORMING SYSTEM INCORPORATING SAME

(71) Applicants: Junya Suzuki, Kanagawa (JP); Kei Sasaki, Kanagawa (JP); Kazuki Seto, Kanagawa (JP); Kotomi Kameyama, Kanagawa (JP)

(72) Inventors: Junya Suzuki, Kanagawa (JP); Kei Sasaki, Kanagawa (JP); Kazuki Seto, Kanagawa (JP); Kotomi Kameyama, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 18/636,689

(22) Filed: Apr. 16, 2024

(65) Prior Publication Data

US 2024/0262650 A1 Aug. 8, 2024

Related U.S. Application Data

(63) Continuation of application No. 18/153,023, filed on Jan. 11, 2023, now Pat. No. 11,987,468.

(30) Foreign Application Priority Data

Jan. 27, 2022 (JP) ................................ 2022-011154
Nov. 8, 2022 (JP) ................................ 2022-178962

(51) Int. Cl.
*B65H 37/04* (2006.01)
*B42C 1/12* (2006.01)
(Continued)

(52) U.S. Cl.
CPC ............... *B65H 37/04* (2013.01); *B42C 1/12* (2013.01); *B65H 35/0073* (2013.01);
(Continued)

(58) Field of Classification Search
CPC ...... B31F 1/07; B31F 5/02; B31F 2201/1784; B31F 2201/0754; B31F 2201/0707;
(Continued)

(56) References Cited

U.S. PATENT DOCUMENTS 7,758,724 B2 7/2010 Akai et al.
9,669,644 B2 6/2017 Taguchi et al.
(Continued)

FOREIGN PATENT DOCUMENTS

JP 2014-148398 8/2014
JP 2014-201432 10/2014
(Continued)

*Primary Examiner* — Leslie A Nicholson, III
(74) *Attorney, Agent, or Firm* — IPUSA, PLLC

(57) ABSTRACT

A medium processing apparatus includes a conveyor, a liquid applier, and a crimper. The conveyor conveys a medium in a conveyance direction. The liquid applier applies liquid to a liquid application position on the medium conveyed by the conveyor. The crimper presses and deforms the liquid application position on a plurality of media including the medium to bind the plurality of media. The liquid applier includes a liquid application rotator configured to rotate, in contact with the medium conveyed by the conveyor, about a pivot extending in a main scanning direction orthogonal to the conveyance direction of the medium and to a thickness direction of the medium, to apply the liquid to the medium.

8 Claims, 14 Drawing Sheets

(51) Int. Cl.
*B65H 35/00* (2006.01)
*B65H 35/04* (2006.01)

(52) U.S. Cl.
CPC ... *B65H 35/04* (2013.01); *B65H 2301/51616* (2013.01); *B65H 2801/27* (2013.01)

(58) Field of Classification Search
CPC B65H 2801/27; B65H 37/04; B65H 37/0073; B65H 2301/51616; B65H 2301/43828; G03G 15/6544; G03G 2215/00852; B42C 1/12
See application file for complete search history.

(56) References Cited

U.S. PATENT DOCUMENTS

| | | | |
|---|---|---|---|
| 9,914,280 | B2 | 3/2018 | Takashima et al. |
| 10,406,772 | B2 | 9/2019 | Takahashi et al. |
| 10,654,240 | B2 | 5/2020 | Takahashi et al. |
| 11,485,155 | B2 | 11/2022 | Yamaguchi et al. |
| 2014/0219747 | A1 | 8/2014 | Takahashi et al. |
| 2015/0123342 | A1 | 5/2015 | Furuhashi et al. |
| 2020/0307945 | A1 | 10/2020 | Mori et al. |
| 2022/0334525 | A1 | 10/2022 | Sasaki et al. |
| 2023/0108507 | A1 | 4/2023 | Fukasawa et al. |

FOREIGN PATENT DOCUMENTS

| | | |
|---|---|---|
| JP | 2015-166281 | 9/2015 |
| JP | 2016-016973 | 2/2016 |
| JP | 2018-199552 | 12/2018 |
| JP | 2019-043759 | 3/2019 |

MEDIUM PROCESSING APPARATUS AND IMAGE FORMING SYSTEM INCORPORATING SAME

CROSS-REFERENCE TO RELATED APPLICATIONS

The present application is a continuation application of U.S. patent application Ser. No. 18/153,023, filed on Jan. 11, 2023, which is based on and claims priority pursuant to 35 U.S.C. § 119(a) to Japanese Patent Application Nos. 2022-011154, filed on Jan. 27, 2022, and 2022-178962, filed on Nov. 8, 2022, in the Japan Patent Office, the entire disclosure of each of which is hereby incorporated by reference herein.

BACKGROUND

Technical Field

Embodiments of the present disclosure relate to a medium processing apparatus and an image forming system incorporating the medium processing apparatus.

Related Art

Medium processing apparatuses are known in the related art that bind, into a bundle, sheet-shaped media on which images are formed by image forming apparatuses. Since sheets of paper are widely known as an example of sheet-shaped media, a "sheet bundle" that is a stack of sheets of paper is used as an example of a bundle of sheet-shaped media in the following description. Some medium processing apparatuses include a crimper that can perform so-called "crimp binding" without metal binding needles (i.e., staples) from a viewpoint of resource saving and reduction in environmental load. Specifically, the crimper sandwiches a sheet bundle with serrate binding teeth to press and deform the sheet bundle.

An increased number of sheets of the sheet bundle hamper the binding teeth in biting into the sheet bundle and may cause some sheets to peel off from the bound sheets. Thus, the crimp binding has some difficulties in keeping the sheet bundle bound as appropriate. To increase the binding strength, some medium processing apparatuses that execute the crimp binding include a liquid applier that applies liquid in advance to a position on a sheet where the binding teeth contact the sheet, to allow the binding teeth to easily bite into a sheet bundle. In the following description, the position where the binding teeth contact a sheet may be referred to as a "binding position."

Variations of binding processes include, but are not limited to, corner oblique binding, parallel one-point binding, and parallel two-point binding. To realize such variations, the liquid applier is rotated or moved in a main scanning direction.

SUMMARY

According to an aspect of the present disclosure, a medium processing apparatus includes a conveyor, a liquid applier, and a crimper. The conveyor conveys a medium in a conveyance direction. The liquid applier applies liquid to a liquid application position on the medium conveyed by the conveyor. The crimper presses and deforms the liquid application position on a plurality of media including the medium to bind the plurality of media. The liquid applier includes a liquid application rotator configured to rotate, in contact with the medium conveyed by the conveyor, about a pivot extending in a main scanning direction orthogonal to the conveyance direction of the medium and to a thickness direction of the medium, to apply the liquid to the medium.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
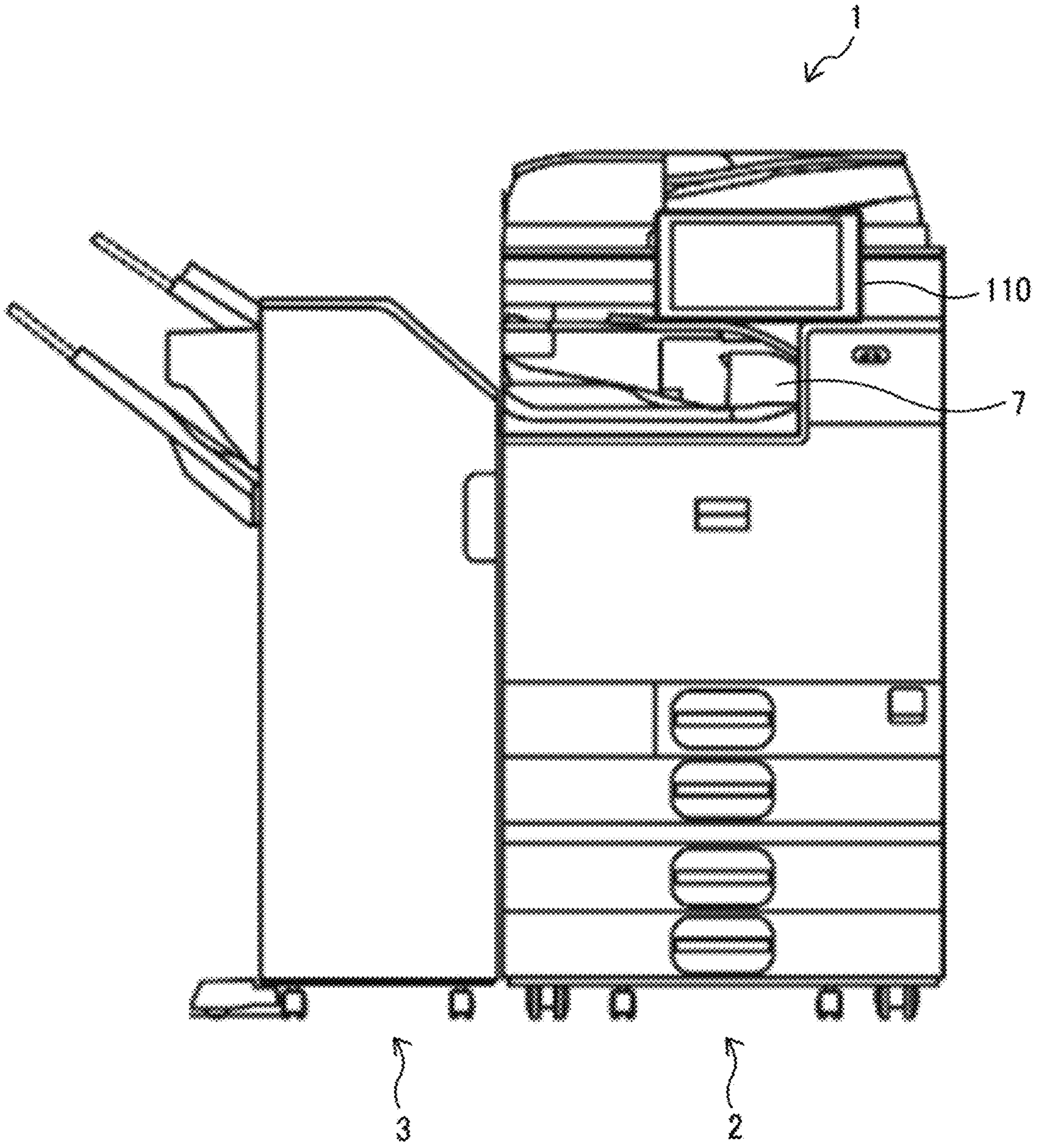
FIG. 1 is a diagram illustrating the overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

As used herein, the term “connected/coupled” includes both direct connections and connections in which there are one or more intermediate connecting elements.

With reference to the drawings, a description is now given of an image forming system 1 according to an embodiment of the present disclosure.

FIG. 1 is a diagram illustrating the overall configuration of the image forming system 1.

The image forming system 1 has a function of forming an image on a sheet P as a medium and performing post-processing on the sheet P on which the image is formed. As illustrated in FIG. 1, the image forming system 1 includes an image forming apparatus 2 and a post-processing apparatus 3 serving as a medium processing apparatus.

The image forming apparatus 2 forms an image on the sheet P and outputs the sheet P bearing the image to the post-processing apparatus 3. The image forming apparatus 2 includes a tray that accommodates the sheet P, a conveyor that conveys the sheet P accommodated in the tray, and an image forming device that forms an image on the sheet P conveyed by the conveyor. The image forming device may be an inkjet image forming device that forms an image with ink or an electrophotographic image forming device that forms an image with toner. Since the image forming apparatus 2 has a typical configuration, a detailed description of the configuration and functions of the image forming apparatus 2 are omitted unless otherwise required. The image forming apparatus 2 further includes a relay conveyor 7 in an in-body sheet output portion, as a medium output portion, of the image forming apparatus 2. The sheet P that is output from the image forming apparatus 2 is conveyed to the post-processing apparatus 3 via the relay conveyor 7.

Figure 2:
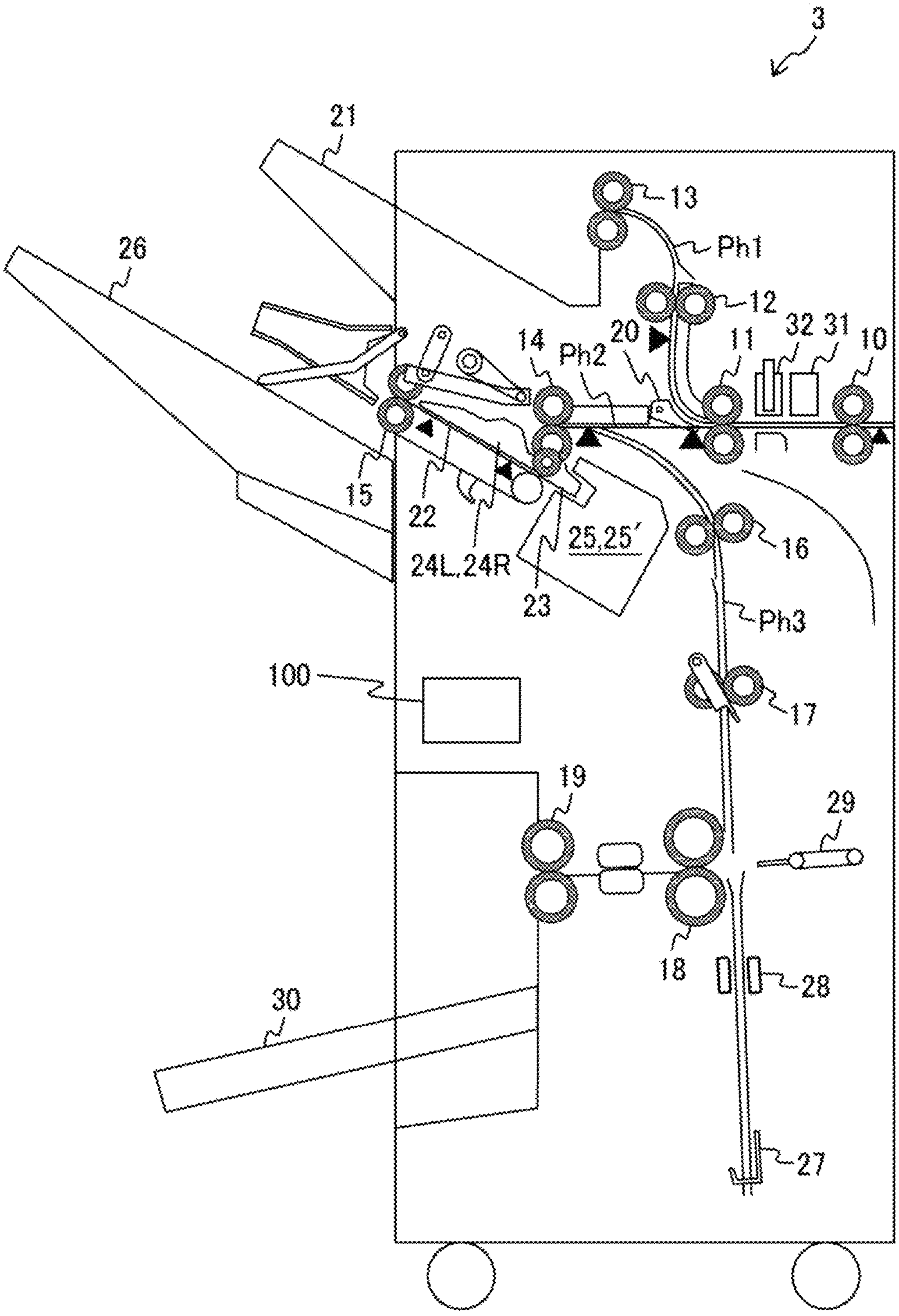
FIG. 2 is a diagram illustrating an internal configuration of a post-processing apparatus in the image forming system of FIG. 1.

FIG. 2 is a diagram illustrating an internal configuration of the post-processing apparatus 3.

The post-processing apparatus 3 performs post-processing on the sheet P on which an image is formed by the image forming apparatus 2. The post-processing according to the present embodiment is binding as a process to bind the sheets P on each of which an image is formed as a bundle of sheets P. In the following description, the bundle of sheets P may be referred to as a “sheet bundle Pb.”

More specifically, the post-processing according to the present embodiment includes so-called “crimp binding” and “stapling.” The crimp binding is a process to press and deform the sheet bundle Pb at a binding position. The stapling is a process to bind the sheet bundle Pb with a staple. The crimp binding includes edge stitching and saddle stitching. The edge stitching is a process to bind an edge of the sheet bundle Pb. The saddle stitching is a process to bind the center of the sheet bundle Pb.

The post-processing apparatus 3 includes conveyance roller pairs 10 to 19 serving as conveyors and a switching claw 20. The conveyance roller pairs 10 to 19 convey, inside the post-processing apparatus 3, the sheet P supplied from the image forming apparatus 2. Specifically, the conveyance roller pairs 10 to 13 convey the sheet P along a first conveyance passage Ph1. The conveyance roller pairs 14 and 15 convey the sheet P along a second conveyance passage Ph2. The conveyance roller pairs 16 to 19 convey the sheet P along a third conveyance passage Ph3.

In the following description, a direction in which the conveyance roller pairs 10, 11, and 14 convey the sheet P is defined as a “conveyance direction”. A direction that is orthogonal to the conveyance direction and a thickness direction of the sheet P is defined as a “main scanning direction” or a “width direction of the sheet P.”

Figure 6A:
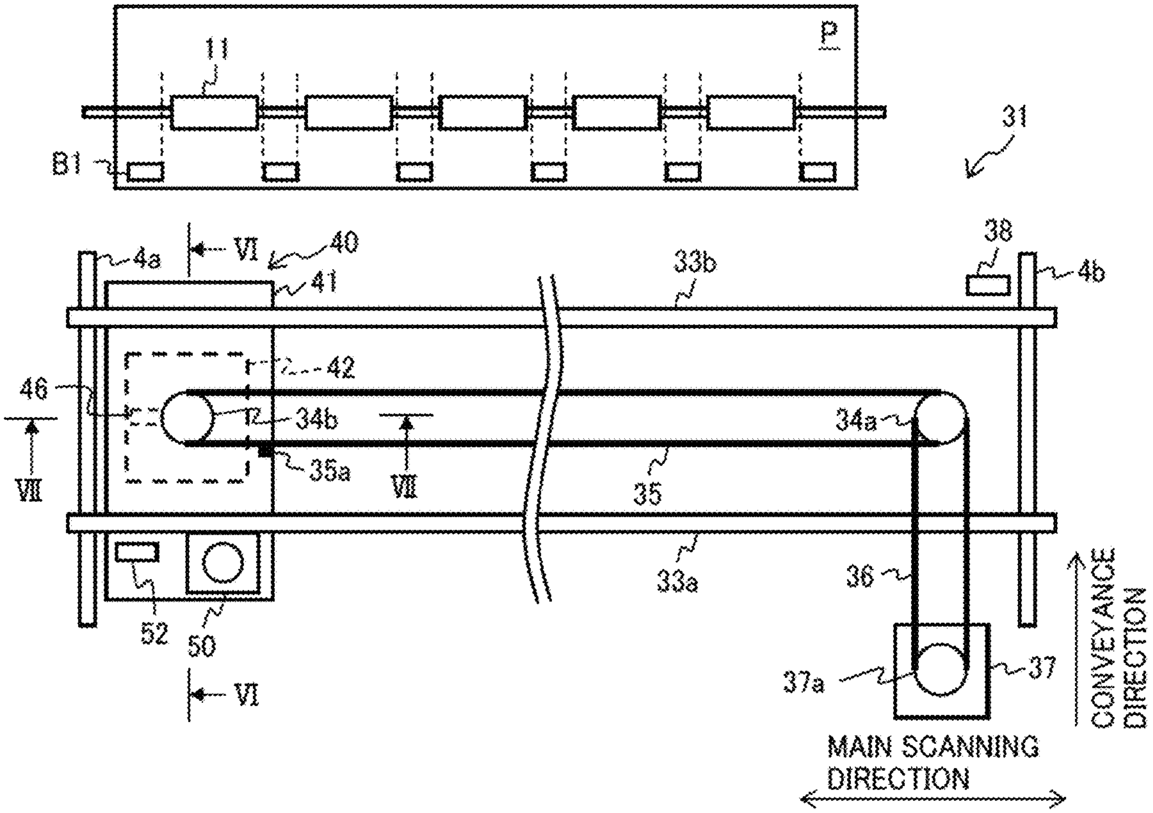
FIGS. 6A and 6B are views of a liquid applier of the post-processing apparatus of FIG. 2 in the thickness direction of the sheet.

As illustrated in FIG. 6A, a plurality of roller pairs of the conveyance roller pair 11 is located so as not to overlap, in the width direction of the sheet P (i.e., main scanning direction), a liquid application position B1 on the sheet P to which liquid has been applied by a liquid application head 46 of a liquid applier 31. This is to prevent the amount of liquid at the liquid application position B1 from decreasing due to the plurality of roller pairs pressing the liquid application position B1 when the conveyance roller pair 11 conveys the sheet P. As a result, when the sheet P reaches a crimper 25 disposed downstream from the liquid applier 31 in the conveyance direction, the amount of liquid at the liquid application position B1 is sufficient to maintain the binding strength. Accordingly, the binding strength of the sheet bundle Pb is prevented from decreasing due to a decrease in the amount of liquid at the liquid application position B1 while the sheet P is conveyed. In addition, the plurality of roller pairs of the conveyance roller pair 11 that is located so as not to overlap the liquid application position B1 on the sheet P in the main scanning direction prevents the conveying performance of the sheet P from being worse due to the adhesion of liquid to the plurality of roller pairs and further prevents a conveyance jam caused when the conveying performance of the sheet P is worsened. Although only the conveyance roller pair 11 has been described above, the plurality of roller pairs of the conveyance roller pairs 14 and 15 are preferably located so as not to overlap the liquid application position B1 on the sheet P in the main scanning direction, like the plurality of roller pairs of the conveyance roller pair 11.

The first conveyance passage Ph1 is a passage extending to an output tray 21 from a supply port through which the sheet P is supplied from the image forming apparatus 2. The second conveyance passage Ph2 is a passage branching from the first conveyance passage Ph1 between the conveyance roller pairs 11 and 14 in the conveyance direction and extending to an output tray 26 via an internal tray 22. The third conveyance passage Ph3 is a passage branching from the first conveyance passage Ph1 between the conveyance roller pairs 11 and 14 in the conveyance direction and extending to an output tray 30.

The switching claw 20 is disposed at a branching position of the first conveyance passage Ph1 and the second conveyance passage Ph2.

The switching claw 20 can be switched between a first position and a second position. The switching claw 20 in the first position guides the sheet P to be output to the output tray 21 through the first conveyance passage Ph1. The switching claw 20 in the second position guides the sheet P conveyed through the first conveyance passage Ph1 to the second conveyance passage Ph2. When a trailing end of the sheet P entering the second conveyance passage Ph2 passes through the conveyance roller pair 11, the conveyance roller pair 14 is rotated in the reverse direction to guide the sheet P to the third conveyance passage Ph3. In FIG. 2, each black triangle indicates a sensor that detects the position of the sheet P during conveyance.

The post-processing apparatus 3 includes the output tray 21. The sheet P that is output through the first conveyance passage Ph1 rests on the output tray 21. Among the sheets P supplied from the image forming apparatus 2, the sheets P that are not bound are output to the output tray 21.

The post-processing apparatus 3 further includes the internal tray 22 serving as a receptacle, an end fence 23, side fences 24L and 24R, the crimper 25, and the output tray 26. The internal tray 22, the end fence 23, the side fences 24L and 24R, the crimper 25, and a stapler 25' perform the edge stitching on the sheet bundle Pb constructed of a plurality of sheets P conveyed through the second conveyance passage Ph2 and placed on the internal tray 22. Among the sheets P supplied from the image forming apparatus 2, the sheet bundle Pb subjected to the edge stitching is output to the output tray 26.

The sheets P that are sequentially conveyed through the second conveyance passage Ph2 are temporarily placed on the internal tray 22. The end fence 23 aligns the position, in an on-tray conveyance direction, of the sheet P or the sheet bundle Pb placed on the internal tray 22. The on-tray conveyance direction is a direction in which the sheet P is conveyed from the conveyance roller pair 15 toward the end fence 23. The on-tray conveyance direction may be different from the conveyance direction described above. The side fences 24L and 24R align the position, in the main scanning direction, of the sheet P or the sheet bundle Pb placed on the internal tray 22. The crimper 25 and the stapler 25' bind an end or edge of the sheet bundle Pb aligned by the end fence 23 and the side fences 24L and 24R. Then, the conveyance roller pair 15 outputs the sheet bundle Pb subjected to the edge stitching to the output tray 26.

The crimper 25 and the stapler 25' are disposed downstream from the internal tray 22 in the on-tray conveyance direction. In addition, the crimper 25 and the stapler 25' are located to face a downstream end, in the on-tray conveyance direction, of the sheet bundle Pb placed on the internal tray 22 and move in the main scanning direction. Further, the crimper 25 and the stapler 25' are pivoted about an axis extending in the thickness direction of the sheet bundle Pb placed on the internal tray 22. In other words, the crimper 25 and the stapler 25' bind, at a desired angle, a desired position in the main scanning direction on the sheet bundle Pb placed on the internal tray 22 in, for example, corner oblique binding, parallel one-point binding, or parallel two-point binding.

The crimper 25 presses and deforms the sheet bundle Pb with serrate binding teeth 25*a* and 25*b* to bind the sheet bundle Pb. In the following description, such a binding way may be referred to as "crimp binding." In other words, the crimper 25 crimps and binds the sheet bundle Pb or performs the crimp binding on the sheet bundle Pb. In short, the crimper 25 binds the sheet bundle Pb without staples. The components of the crimper 25 such as the binding teeth 25*a* serving as upper crimping teeth and the binding teeth 25*b* serving as lower crimping teeth are disposed on a crimping frame 25*c*. In the following description, the binding teeth 25*a* and the binding teeth 25*b* may be referred to as a pair of binding teeth 25*a* and 25*b*. On the other hand, the stapler 25' passes the staple through a binding position on the sheet bundle Pb placed on the internal tray 22 to staple the sheet bundle Pb.

Figure 3A:
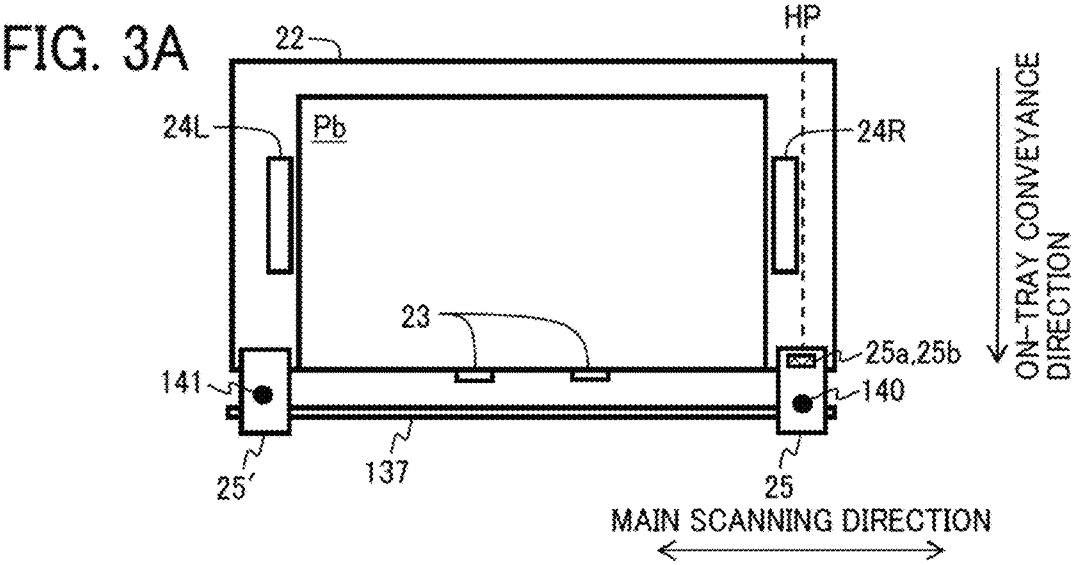
FIGS. 3A to 3C are views of an internal tray of the post-processing apparatus of FIG. 2 in a thickness direction of a sheet.
Figure 3B:
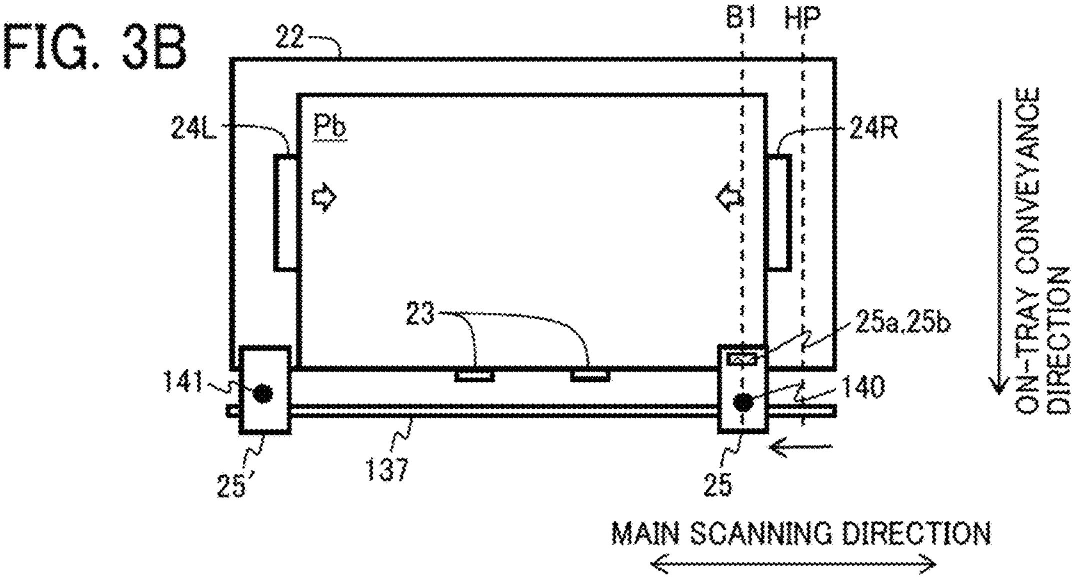
Figure 3C:
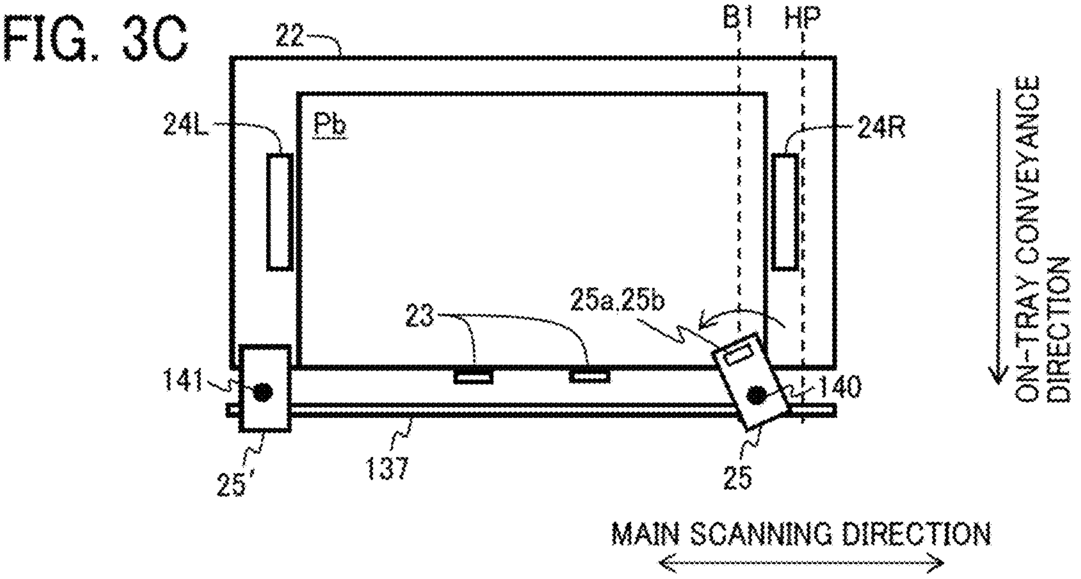
Figure 4:
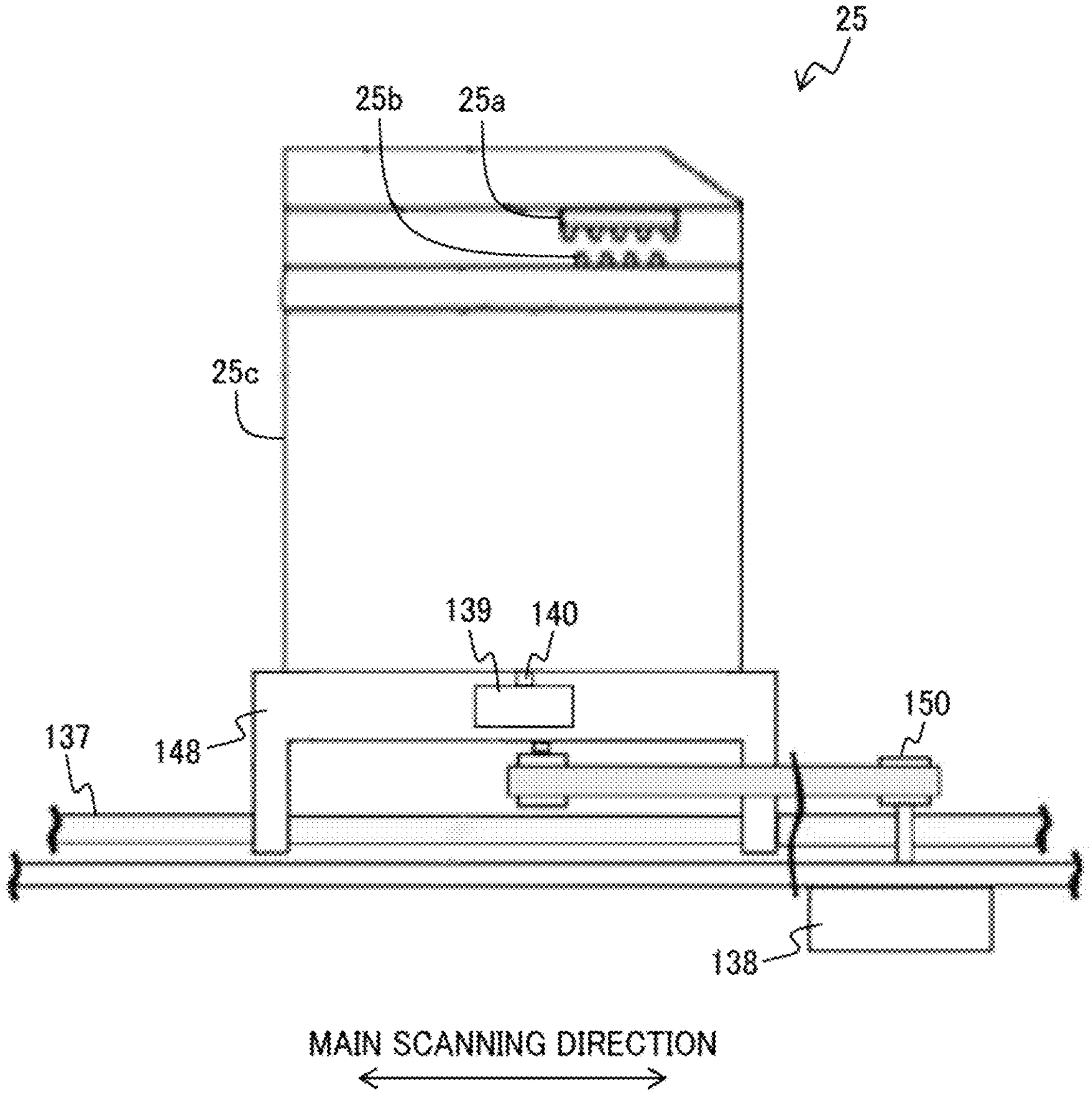
FIG. 4 is a schematic view of an upstream side of a crimper of the post-processing apparatus of FIG. 2 in a conveyance direction.

Each of FIGS. 3A to 3C is a view of the internal tray 22 in the thickness direction of the sheet bundle Pb. FIG. 4 is a schematic view of an upstream side of the crimper 25 in the on-tray conveyance direction.

As illustrated in FIGS. 3A to 3C, the crimper 25 is disposed downstream from the internal tray 22 in the on-tray conveyance direction. The crimper 25 moves in the main scanning direction along the surface of the sheet bundle Pb placed on the internal tray 22. The crimper 25 is also pivoted about a pivot 140 extending in the thickness direction of the sheet bundle Pb placed on the internal tray 22. The thickness direction of the sheet bundle Pb is a direction orthogonal to the on-tray conveyance direction and to the main scanning direction. Similarly, the stapler 25' moves in the main scanning direction of the sheet bundle Pb and is pivoted about a pivot 141 extending in the thickness direction of the sheet bundle Pb.

More specifically, as illustrated in FIG. 4, a guide rail 137 extending in the main scanning direction is disposed downstream from the internal tray 22 in the on-tray conveyance direction. The crimper 25 is moved in the main scanning direction along the surface of the sheet bundle Pb placed on the internal tray 22, in other words, along the guide rail 137, by a driving force transmitted from a crimper movement motor 138 by a drive transmission assembly 150 including a pulley and a timing belt. The pivot 140 is fixed to a bottom face of the crimping frame 25*c* that holds the components of the crimper 25. The pivot 140 is rotatably held by a base 148 on which the crimping frame 25*c* is disposed. When a driving force is transmitted from a pivot motor 139 to the pivot 140, the crimper 25 is pivoted about the pivot 140 extending in the thickness direction of the sheet P placed on the internal tray 22. The guide rail 137, the crimper movement motor 138, the pivot motor 139, the pivot 140, and the drive transmission assembly 150 construct a driving assembly of the crimper 25.

The crimper 25 moves between a standby position HP illustrated in FIG. 3A and a position where the crimper 25 faces a binding position that corresponds to the liquid application position B1 illustrated in FIGS. 3B and 3C. In the following description, the binding position may be referred to as binding position B1. The standby position HP is away in the main scanning direction from the sheet bundle Pb placed on the internal tray 22. For example, in FIGS. 3A to 3C, the standby position HP is distanced to the right of the sheet bundle Pb along the main scanning direction. The binding position B1 is a position on the sheet bundle Pb placed on the internal tray 22. However, the specific position of the binding position B1 is not limited to the position illustrated in FIGS. 3B and 3C. The binding position B1 may be one or more positions along the main scanning direction at the downstream end, in the on-tray conveyance direction, of the sheet P.

The posture of the crimper 25 changes, in other words, the crimper 25 is pivoted, between a parallel binding posture illustrated in FIG. 3B and an oblique binding posture illustrated in FIG. 3C. The parallel binding posture is a posture of the crimper 25 in which the length of the pair of binding teeth 25*a* and 25*b* (in other words, a rectangular crimp binding trace) is along the main scanning direction. The oblique binding posture is a posture of the crimper 25 in which the length of the pair of binding teeth 25*a* and 25*b* (in other words, the rectangular crimp binding trace) is inclined with respect to the main scanning direction.

The pivot angle, which is an angle of the pair of binding teeth 25*a* and 25*b* with respect to the main scanning direction, in the oblique binding posture is not limited to the angle illustrated in FIG. 3C. The pivot angle in the oblique binding posture may be any angle provided that the pair of binding teeth 25*a* and 25*b* faces the sheet bundle Pb placed on the internal tray 22. In the following description, the crimp binding performed by the crimper 25 in the parallel binding posture may be referred to as "parallel binding" whereas the crimp binding performed by the crimper 25 in the oblique binding posture may be referred to as "oblique binding."

Figure 5A:
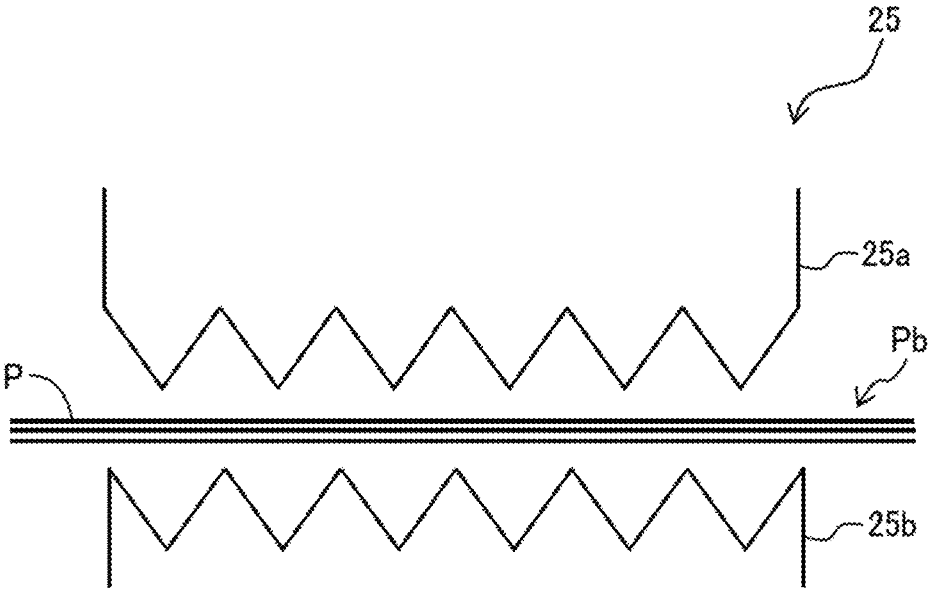
FIGS. 5A and 5B are schematic diagrams illustrating a configuration of the crimper of FIG. 4.
Figure 5B:

FIGS. 5A and 5B are schematic diagrams illustrating the configuration of the crimper 25.

As illustrated in FIGS. 5A and 5B, the crimper 25 includes the pair of binding teeth 25*a* and 25*b*. The binding teeth 25*a* and the binding teeth 25*b* are disposed to face each other in the thickness direction of the sheet bundle Pb so as to sandwich the sheet bundle Pb placed on the internal tray 22. The binding teeth 25*a* and the binding teeth 25*b* have respective serrate faces facing each other. The serrate face of each of the binding teeth 25*a* and the binding teeth 25*b* includes concave portions and convex portions alternately formed. The concave portions and the convex portions of the binding teeth 25*a* are shifted from those of the binding teeth 25*b* such that the binding teeth 25*a* are engaged with the binding teeth 25*b*. The binding teeth 25*a* and the binding teeth 25*b* are brought into contact with and separated from each other by a driving force of a contact-separation motor 142 illustrated in FIG. 9.

The configuration of the crimper 25 as a crimping assembly is not limited to the configuration of the present embodiment provided that the binding teeth 25*a* and the binding teeth 25*b* of the crimping assembly are engaged with each other. For example, the crimping assembly may be a crimping assembly disclosed in Japanese Patent No. 6057167 or its corresponding U.S. patent Application Publication No. 2014-0219747, which is hereby incorporated by reference as though disclosed herein in its entirety. In this case, the crimping assembly brings the binding teeth 25*a* and the binding teeth 25*b* into contact with each other and separates the binding teeth 25*a* and the binding teeth 25*b* from each other with a link assembly and a driving source that simply rotates forward or that rotates forward and backward. Alternatively, the crimping assembly may employ a linear motion system to linearly bring the binding teeth 25*a* and the binding teeth 25*b* into contact with each other and separate the binding teeth 25*a* and the binding teeth 25*b* from each other with a screw assembly that converts the rotational motion of a driving source into linear motion.

In a process in which the sheets P of the sheet bundle Pb are supplied to the internal tray 22, the binding teeth 25*a* and the binding teeth 25*b* are apart from each other as illustrated in FIG. 5A. When all the sheets P of the sheet bundle Pb are placed on the internal tray 22, the binding teeth 25*a* and the binding teeth 25*b* are engaged with each other to press and deform the sheet bundle Pb in the thickness direction as illustrated in FIG. 5B.

As a result, the sheet bundle Pb that has been placed on the internal tray 22 is crimped and bound. The sheet bundle Pb thus crimped and bound is output to the output tray 26 by the conveyance roller pair 15.

Referring back to FIG. 2, the post-processing apparatus 3 further includes an end fence 27, a saddle binder 28, a sheet folding blade 29, and the output tray 30. The end fence 27, the saddle binder 28, and the sheet folding blade 29 perform the saddle stitching on the sheet bundle Pb conveyed through the third conveyance passage Ph3. Among the sheets P supplied from the image forming apparatus 2, the sheet bundle Pb subjected to the saddle stitching is output to the output tray 30.

The end fence 27 aligns the positions, in the conveyance direction, of the sheets P sequentially conveyed through the third conveyance passage Ph3. The end fence 27 can move between a binding position where the end fence 27 causes the center of the sheet bundle Pb to face the saddle binder 28 and a folding position where the end fence 27 causes the center of the sheet bundle Pb to face the sheet folding blade 29. The saddle binder 28 binds the center of the sheet bundle Pb aligned by the end fence 27 at the binding position. The sheet folding blade 29 folds, in half, the sheet bundle Pb supported by the end fence 27 at the folding position and causes the conveyance roller pair 18 to sandwich the sheet bundle Pb. The conveyance roller pairs 18 and 19 output the sheet bundle Pb subjected to the saddle stitching to the output tray 30.

Figure 13:
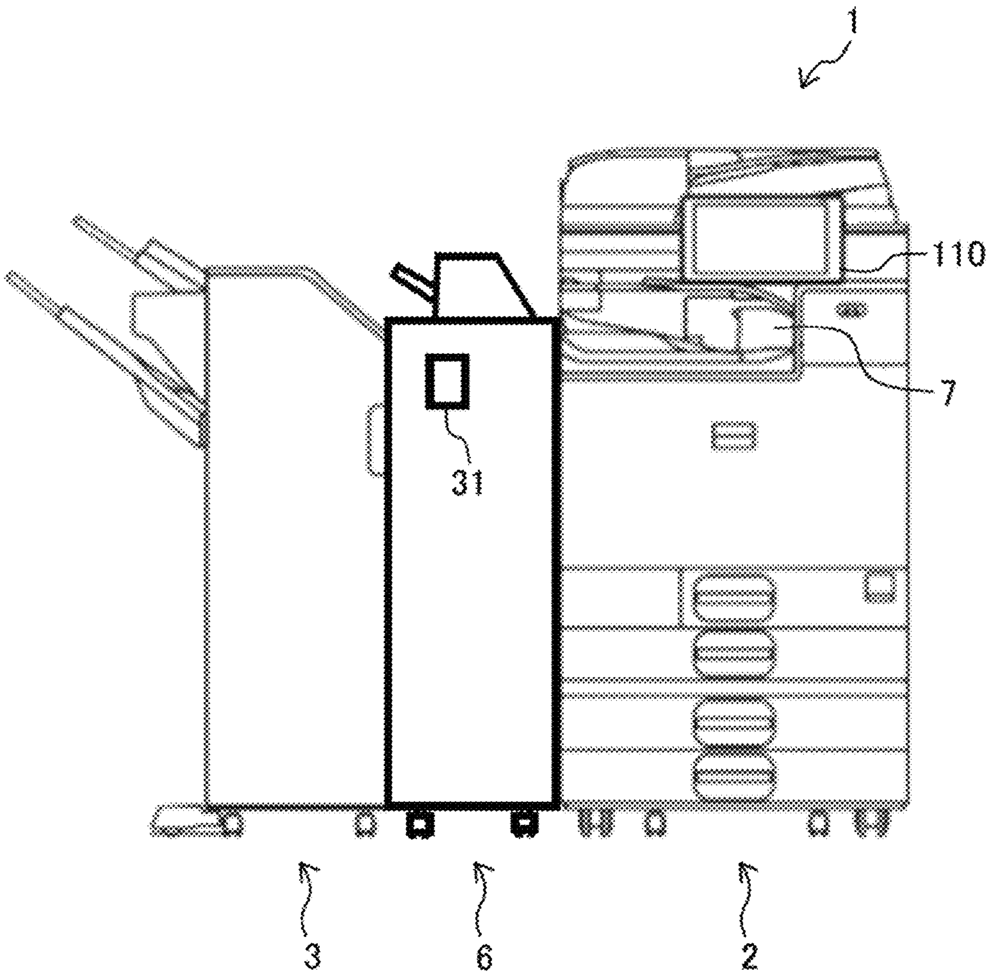
FIG. 13 is a diagram illustrating the overall configuration of an image forming system according to another embodiment of the present disclosure.

The post-processing apparatus 3 includes the liquid applier 31 and a hole punch 32 serving as a processor. The liquid applier 31 and the hole punch 32 are disposed upstream from the internal tray 22 in the conveyance direction. In addition, the liquid applier 31 and the hole punch 32 are disposed at different positions in the conveyance direction to simultaneously face one sheet P that is conveyed by the conveyance roller pairs 10 to 19. The liquid applier 31 and the hole punch 32 according to the present embodiment are disposed between the conveyance roller pairs 10 and 11. However, the arrangement of the liquid applier 31 and the hole punch 32 is not limited to the arrangement illustrated in FIG. 2. For example, in a case where an inserter 6 is disposed between the image forming apparatus 2 and the post-processing apparatus 3 as illustrated in FIG. 13, the liquid applier 31 may be disposed in the inserter 6 located upstream from the post-processing apparatus 3 in a direction in which the sheet P is conveyed from the image forming apparatus 2 to the post-processing apparatus 3. Examples of the inserter 6 include, but are not limited to, an apparatus that allows a pre-printed medium, which is to be conveyed to the post-processing apparatus 3 together with the sheet P conveyed from the image forming apparatus 2, to be fed as a cover sheet, an insertion sheet, or a partition sheet without passing through the image forming apparatus 2.

Figure 14:
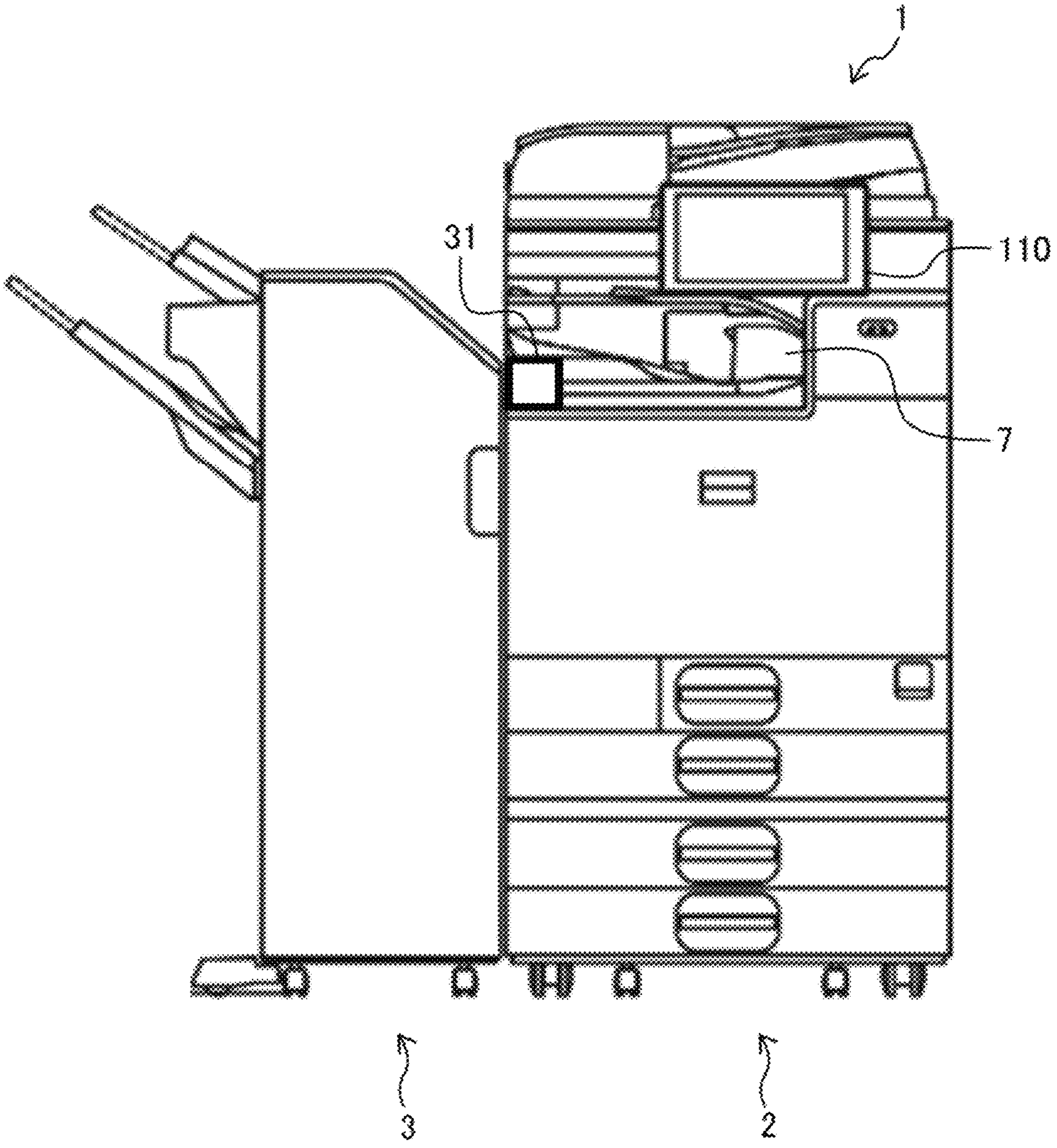
FIG. 14 is a diagram illustrating the overall configuration of an image forming system according to yet another embodiment of the present disclosure.

As illustrated in FIG. 14, the liquid applier 31 may be disposed in the relay conveyor 7 connecting the image forming apparatus 2 and the post-processing apparatus 3. Examples of the relay conveyor 7 include, but are not limited to, an apparatus that sorts and conveys sheets output from the image forming apparatus 2 to an output tray of the image forming apparatus 2 and the post-processing apparatus 3. The inserter 6 and the relay conveyor 7 described above serve as intermediate apparatuses.

The liquid applier 31 applies liquid (for example, water) to the sheet P that is conveyed by the conveyance roller pairs 10 and 11. In the following description, the application of liquid may be referred to as "liquid application." The hole punch 32 punches a hole in the sheet P that is conveyed by the conveyance roller pairs 10 and 11 such that the hole penetrates the sheet P in the thickness direction of the sheet P.

The processor disposed near the liquid applier 31 is not limited to the hole punch 32. Alternatively, the processor may be an inclination corrector that corrects an inclination or skew of the sheet P that is conveyed by the conveyance roller pairs 10 and 11.

More specifically, the liquid described above includes, as a main component, a liquid hydrogen-oxygen compound represented by the chemical formula $H_2O$. The liquid hydrogen-oxygen compound is at any temperature. For example, the liquid hydrogen-oxygen compound may be so-called warm water or hot water. The liquid hydrogen-oxygen compound is not limited to pure water. The liquid hydrogen-oxygen compound may be purified water or may contain ionized salts. The metal ion content ranges from so-called soft water to ultrahard water. In other words, the liquid hydrogen-oxygen compound is at any hardness.

The liquid that is stored in a liquid storage tank 43 may include an additive in addition to the main component. The liquid that is stored in the liquid storage tank 43 may include residual chlorine used as tap water. Preferably, for example, the liquid that is stored in the liquid storage tank 43 may include, as an additive, a colorant, a penetrant, a pH adjuster, a preservative such as phenoxyethanol, a drying inhibitor such as glycerin, or a combination thereof. Since water is used as a component of ink used for inkjet printers or ink used for water-based pens, such water or ink may be used as the liquid.

The water is not limited to the specific examples described above. The water may be water in a broad sense such as hypochlorous acid water or an ethanol aqueous solution diluted for disinfection. However, tap water may be used simply for the crimp binding because tap water is easy to obtain and store. A liquid including water as a main component as exemplified above enhances the binding strength of the sheet bundle Pb, as compared with a liquid of which the main component is not water.

Figure 6B:
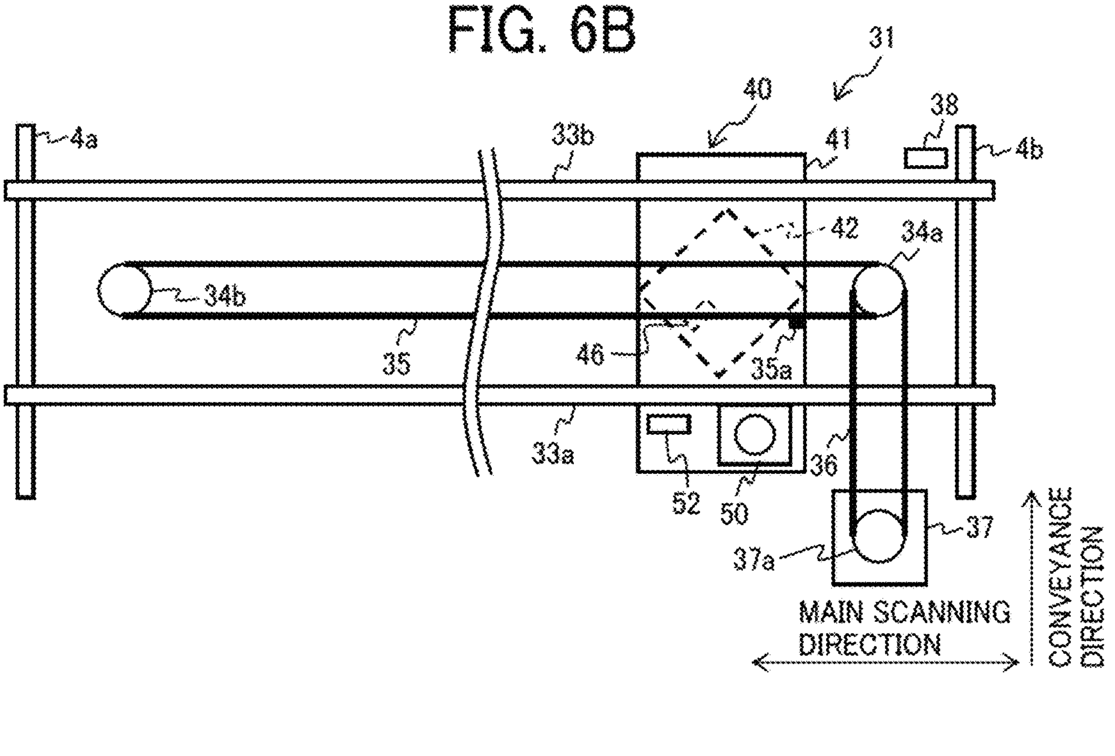
Figures 7A, 7B, 7C:
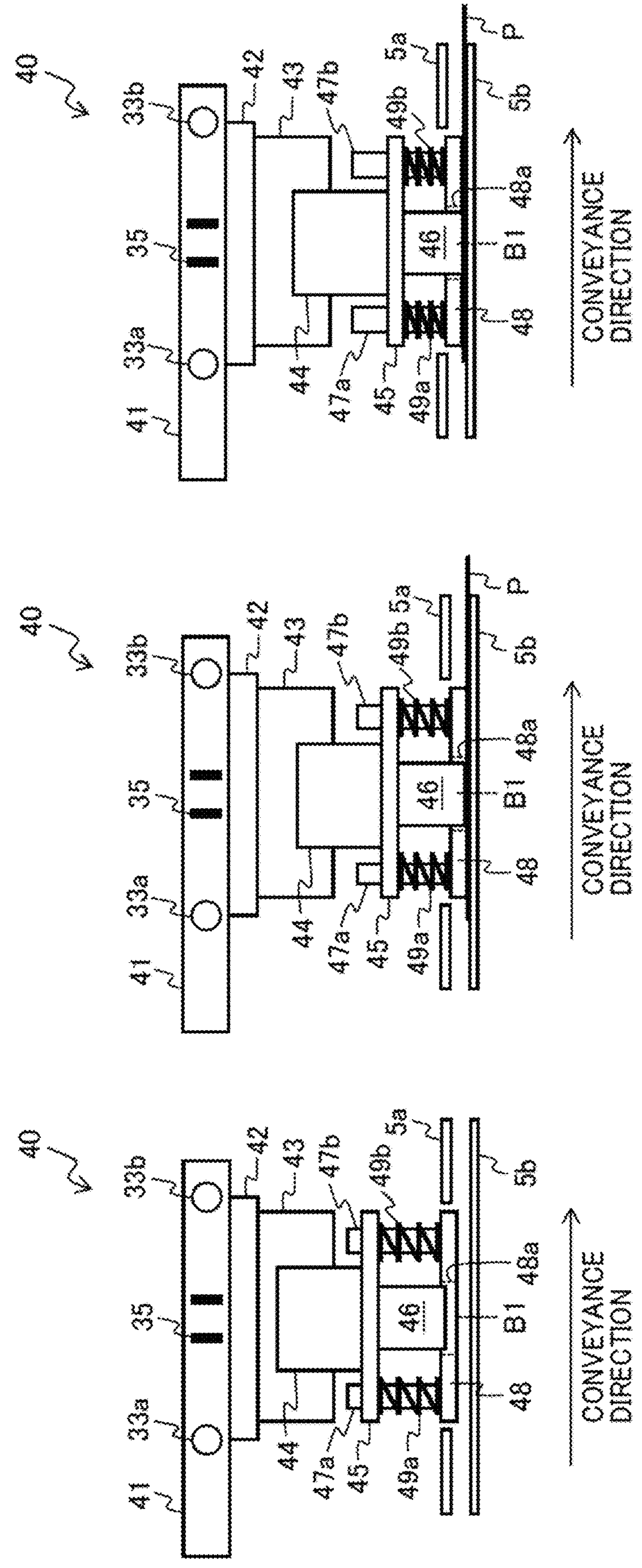
FIGS. 7A to 7C are cross-sectional views of a liquid application unit of the liquid applier taken through VI-VI of FIG. 6A.
Figure 8C:
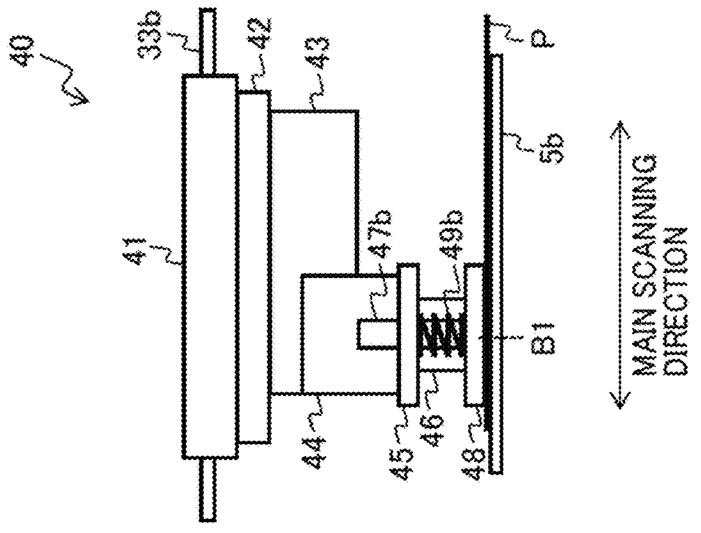
FIGS. 8A to 8C are cross-sectional views of the liquid application unit of the liquid applier taken through VII-VII of FIG. 6A.
Figure 8B:
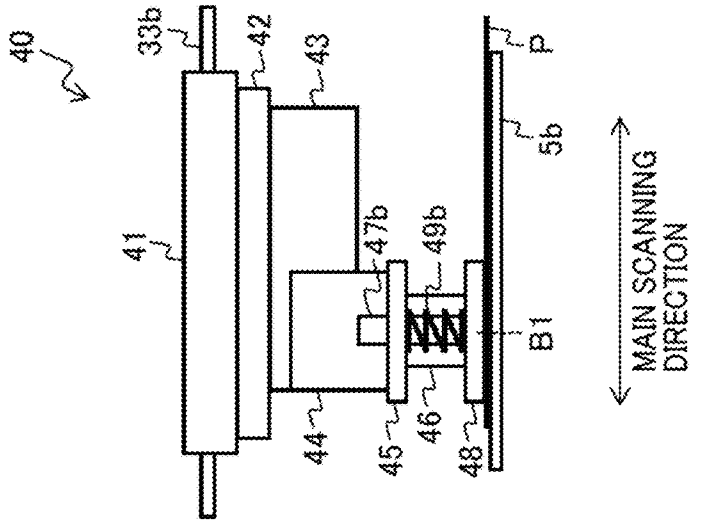
Figure 8A:
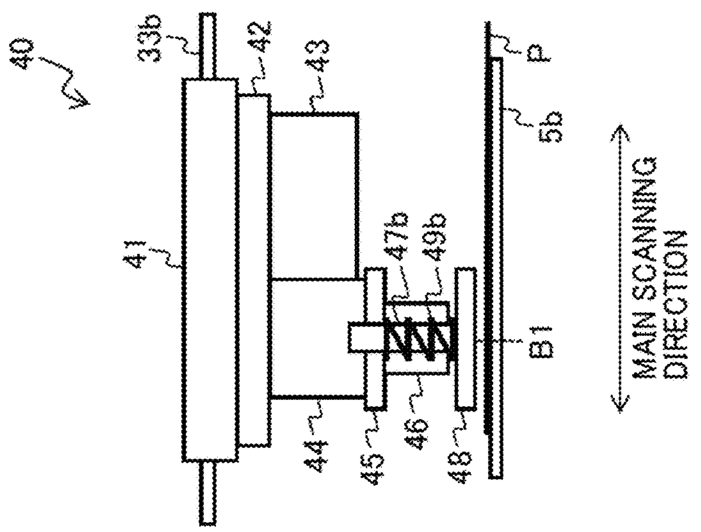

FIGS. 6A and 6B are views of the liquid applier 31 in the thickness direction of the sheet P. FIGS. 7A to 7C are cross-sectional views of a liquid application unit 40 of the liquid applier 31 taken through VI-VI of FIG. 6A. FIGS. 8A to 8C are cross-sectional views of the liquid application unit 40 of the liquid applier 31 taken through VII-VII of FIG. 6A.

As illustrated in FIGS. 6A to 8C, the liquid applier 31 includes a pair of guide shafts 33*a* and 33*b*, a pair of pulleys 34*a* and 34*b*, endless annular belts 35 and 36, a liquid applier movement motor 37, a standby position sensor 38, and the liquid application unit 40.

The guide shafts 33*a* and 33*b*, each extending in the main scanning direction, are apart from each other in the conveyance direction. The pair of guide shafts 33*a* and 33*b* is supported by a pair of side plates 4*a* and 4*b* of the post-processing apparatus 3. On the other hand, the pair of guide shafts 33*a* and 33*b* supports the liquid application unit 40 such that the liquid application unit 40 can move in the main scanning direction.

The pair of pulleys 34*a* and 34*b* is disposed between the guide shafts 33*a* and 33*b* in the conveyance direction. On the other hand, the pulleys 34*a* and 34*b* are apart from each other in the main scanning direction. The pair of pulleys 34*a* and 34*b* is supported by a frame of the post-processing apparatus 3 so as to be rotatable about an axis extending in the thickness direction of the sheet P.

The endless annular belt 35 is entrained around the pair of pulleys 34*a* and 34*b*. The endless annular belt 35 is coupled to the liquid application unit 40 by a connection 35*a*. The endless annular belt 36 is entrained around the pulley 34*a* and a driving pulley 37*a* that is fixed to an output shaft of the liquid applier movement motor 37. The liquid applier movement motor 37 generates a driving force to move the liquid application unit 40 in the main scanning direction.

As the liquid applier movement motor 37 rotates, the endless annular belt 36 circulates around the pulley 34*a* and the driving pulley 37*a* to rotate the pulley 34*a*. As the pulley 34*a* rotates, the endless annular belt 35 circulates around the pair of pulleys 34*a* and 34*b*. As a result, the liquid application unit 40 moves in the main scanning direction along the pair of guide shafts 33*a* and 33*b*. The liquid application unit 40 reciprocates in the main scanning direction in response to the rotation direction of the liquid applier movement motor 37 being switched.

The standby position sensor 38 detects that the liquid application unit 40 has reached a standby position in the main scanning direction. The standby position sensor 38 then outputs a standby position signal indicating the detection result to a controller 100, which is described below with reference to FIG. 9. The standby position sensor 38 is, for example, an optical sensor including a light emitting unit and a light receiving unit.

The liquid application unit 40 at the standby position blocks an optical path between the light emitting unit and the light receiving unit.

Then, the standby position sensor 38 outputs the standby position signal in response to the light output from the light emitting unit not being received by the light receiving unit. The specific configuration of the standby position sensor 38 is not limited to the configuration described above.

As illustrated in FIGS. 7A to 7C, the conveyance passage inside the post-processing apparatus 3 is defined by an upper guide plate 5*a* and a lower guide plate 5*b*, which are apart from each other in the thickness direction of the sheet P. The liquid application unit 40 is located to face an opening of the upper guide plate 5*a*. In other words, the liquid application unit 40 faces the conveyance passage through the opening of the upper guide plate 5*a* to face the sheet P conveyed along the conveyance passage.

Figure 9:
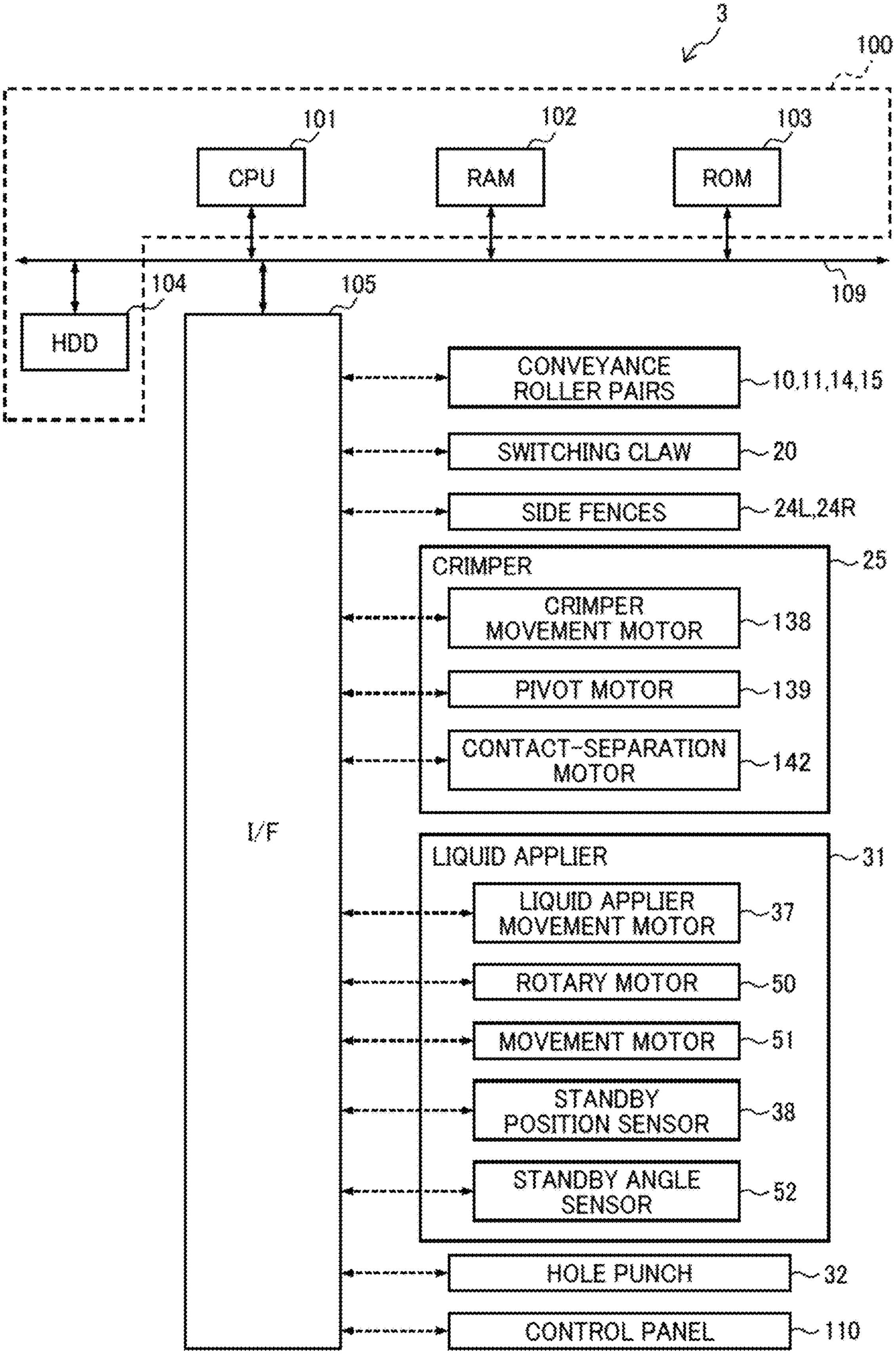
FIG. 9 is a block diagram illustrating a hardware configuration of the post-processing apparatus of FIG. 2 to control the operation of the post-processing apparatus.

As illustrated in FIGS. 6A to 8C, the liquid application unit 40 includes a base 41, a rotary bracket 42, the liquid storage tank 43, a mover 44, a holder 45, the liquid application head 46 serving as a liquid application member, columns 47*a* and 47*b*, a pressure plate 48, coil springs 49*a* and 49*b*, a rotary motor 50, a movement motor 51 illustrated in FIG. 9, and a standby angle sensor 52.

The base 41 is supported by the pair of guide shafts 33*a* and 33*b* so as to be slidable in the main scanning direction. The base 41 is coupled to the endless annular belt 35 by the connection 35*a*. On the other hand, the base 41 supports the components of the liquid application unit 40 such as the rotary bracket 42, the liquid storage tank 43, the mover 44, the holder 45, the liquid application head 46, the columns 47*a* and 47*b*, the pressure plate 48, the coil springs 49*a* and 49*b*, the rotary motor 50, the movement motor 51, and the standby angle sensor 52.

The rotary bracket 42 is supported by a lower face of the base 41 so as to be pivotable about an axis extending in the thickness direction of the sheet P. The rotary bracket 42 is rotated with respect to the base 41 by a driving force transmitted from the rotary motor 50. On the other hand, the rotary bracket 42 supports the liquid storage tank 43, the mover 44, the holder 45, the liquid application head 46, the columns 47*a* and 47*b*, the pressure plate 48, and the coil springs 49*a* and 49*b*.

The standby angle sensor 52 detects that the rotary bracket 42 has reached a standby angle. The standby angle sensor 52 then outputs a standby angle signal indicating the detection result to the controller 100. The standby angle is, for example, an angle for the parallel binding. The standby angle sensor 52 is, for example, an optical sensor including a light emitting unit and a light receiving unit. The rotary bracket 42 at the standby angle blocks an optical path between the light emitting unit and the light receiving unit. Then, the standby angle sensor 52 outputs the standby angle signal in response to the light output from the light emitting unit not being received by the light receiving unit. The specific configuration of the standby angle sensor 52 is not limited to the configuration described above. Note that FIG. 6A illustrates the rotary bracket 42 in a position for the parallel binding that is performed by the crimper 25 disposed downstream from the liquid applier 31 in a direction in which the sheet P is conveyed. FIG. 6B illustrates the rotary bracket 42 in a position for the oblique binding (i.e., corner binding) that is performed by the crimper 25 disposed downstream from the liquid applier 31 in the direction in which the sheet P is conveyed.

The liquid storage tank 43 stores liquid to be applied to the sheet P. The mover 44 is supported by the liquid storage tank 43 so as to be movable (for example, up and down) in the thickness direction of the sheet P. The mover 44 is moved with respect to the liquid storage tank 43 by a driving force transmitted from the movement motor 51. The holder 45 is attached to a lower end of the mover 44. The liquid application head 46 projects from the holder 45 toward the conveyance passage (downward in the present embodiment). The liquid that is stored in the liquid storage tank 43 is supplied to the liquid application head 46. The liquid application head 46 is made of a material having a relatively high liquid absorption (for example, sponge or fiber).

The columns 47*a* and 47*b* project downward from the holder 45 around the liquid application head 46. The columns 47*a* and 47*b* can move relative to the holder 45 in the thickness direction. The columns 47*a* and 47*b* have respective lower ends holding the pressure plate 48. The pressure plate 48 has a through hole 48*a* at a position where the through hole 48*a* faces the liquid application head 46. The coil springs 49*a* and 49*b* are fitted around the columns 47*a* and 47*b*, respectively, between the holder 45 and the pressure plate 48. The coil springs 49*a* and 49*b* bias the columns 47*a* and 47*b* and the pressure plate 48 downward with respect to the holder 45.

As illustrated in FIGS. 7A and 8A, before the sheet P is conveyed to the position where the sheet P faces the opening of the upper guide plate 5*a*, the pressure plate 48 is positioned at or above the opening. Next, when the sheet P that is conveyed by the conveyance roller pairs 10 and 11 stops at a position where the liquid application position B1 on the sheet P faces the opening, the movement motor 51 is rotated in a first direction. As a result, the mover 44, the holder 45, the liquid application head 46, the columns 47*a* and 47*b*, the pressure plate 48, and the coil springs 49*a* and 49*b* are moved down together to allow the pressure plate 48 to contact the sheet P. Note that the liquid application position B1 corresponds to the binding position B1 to be crimped and bound by the crimper 25.

As the movement motor 51 keeps rotating in the first direction after the pressure plate 48 contacts the sheet P, the coil springs 49*a* and 49*b* are compressed to further move down the mover 44, the holder 45, the liquid application head 46, and the columns 47*a* and 47*b*. As a result, as illustrated in FIGS. 7B and 8B, a lower face of the liquid application head 46 contacts the sheet P through the through hole 48*a*. Then, the liquid contained in the liquid application head 46 is applied to the sheet P.

In short, the pressure plate 48 presses the sheet P before the end of the liquid application head 46 contacts the sheet P. Then, the pressure plate 48 presses the periphery of the end of the liquid application head 46 when the liquid application head 46 applies liquid to the sheet P. Such a configuration reliably prevents the sheet P from floating even when the sheet P is wavy or curved. Accordingly, the liquid is applied accurately.

Further rotation of the movement motor 51 in the first direction further strongly presses the liquid application head 46 against the sheet P as illustrated in FIGS. 7C and 8C. Accordingly, the amount of liquid that is applied to the sheet P increases. In short, the liquid applier 31 changes the pressing force of the liquid application head 46 against the sheet P to adjust the amount of liquid that is applied to the sheet P.

On the other hand, the rotation of the movement motor 51 in a second direction opposite to the first direction moves up the mover 44, the holder 45, the liquid application head 46, the columns 47*a* and 47*b*, the pressure plate 48, and the coil springs 49*a* and 49*b* together. Since the pressure plate 48 is biased toward the sheet P by the coil springs 49*a* and 49*b*, the end of the liquid application head 46 is separated from the sheet P earlier than the pressure plate 48 that is in contact with the sheet P.

Thereafter, as the mover 44 moves in a direction away from the sheet P, the liquid application head 46 and the pressure plate 48 are separated from the sheet P as illustrated in FIGS. 7A and 8A. In other words, the liquid applier 31 includes the liquid application head 46 that can be separated from the sheet P.

As described above, the pressure plate 48 keeps pressing the sheet P while the end of the liquid application head 46 is apart from the sheet P. Then, as illustrated in FIG. 7A, the pressure plate 48 moves to the release position to release pressure applied to the sheet P when the end of the liquid application head 46 moves to the separation position so as to be completely apart from the sheet P. Such a configuration reliably prevents the sheet P from sticking to the end of the liquid application head 46 after the liquid application head 46 completes a liquid application process. Accordingly, the liquid is smoothly applied to the subsequent sheet P.

FIG. 9 is a block diagram illustrating a hardware configuration of the post-processing apparatus 3 to control the operation of the post-processing apparatus 3.

As illustrated in FIG. 9, the post-processing apparatus 3 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected to each other via a common bus 109.

The CPU 101 is an arithmetic unit and controls the overall operation of the post-processing apparatus 3. The RAM 102 is a volatile storage medium that allows data to be read and written at high speed. The CPU 101 uses the RAM 102 as a work area for data processing. The ROM 103 is a read-only non-volatile storage medium that stores programs such as firmware. The HDD 104 is a non-volatile storage medium that allows data to be read and written and has a relatively large storage capacity. The HDD 104 stores, for example, an operating system (OS), various control programs, and application programs.

By an arithmetic function of the CPU 101, the post-processing apparatus 3 processes, for example, a control program stored in the ROM 103 and an information processing program (application program) loaded into the RAM 102 from a storage medium such as the HDD 104. Such processing configures a software controller including various functional modules of the post-processing apparatus 3. The software controller thus configured cooperates with hardware resources of the post-processing apparatus 3 to construct functional blocks that implement functions of the post-processing apparatus 3. In other words, the CPU 101, the RAM 102, the ROM 103, and the HDD 104 construct a controller 100 that controls the operation of the post-processing apparatus 3.

The I/F 105 is an interface that connects the conveyance roller pairs 10, 11, 14, and 15, the switching claw 20, the side fences 24L and 24R, the crimper 25, the liquid applier 31, the hole punch 32, and a control panel 110 to the common bus 109. The controller 100 controls, via the I/F 105, the operations of the conveyance roller pairs 10, 11, 14, and 15, the switching claw 20, the side fences 24L and 24R, the crimper 25, the liquid applier 31, and the hole punch 32. Although FIG. 9 illustrates the components that execute the edge stitching, the components that execute the saddle stitching are controlled by the controller 100 like the components that execute the edge stitching.

The control panel 110 includes an operation unit that receives instructions input by a user and a display serving as a notifier that notifies the user of information. The operation unit includes, for example, hard keys and a touch panel superimposed on a display. The control panel 110 acquires information from the user through the operation unit and provides information to the user through the display.

Figure 10:
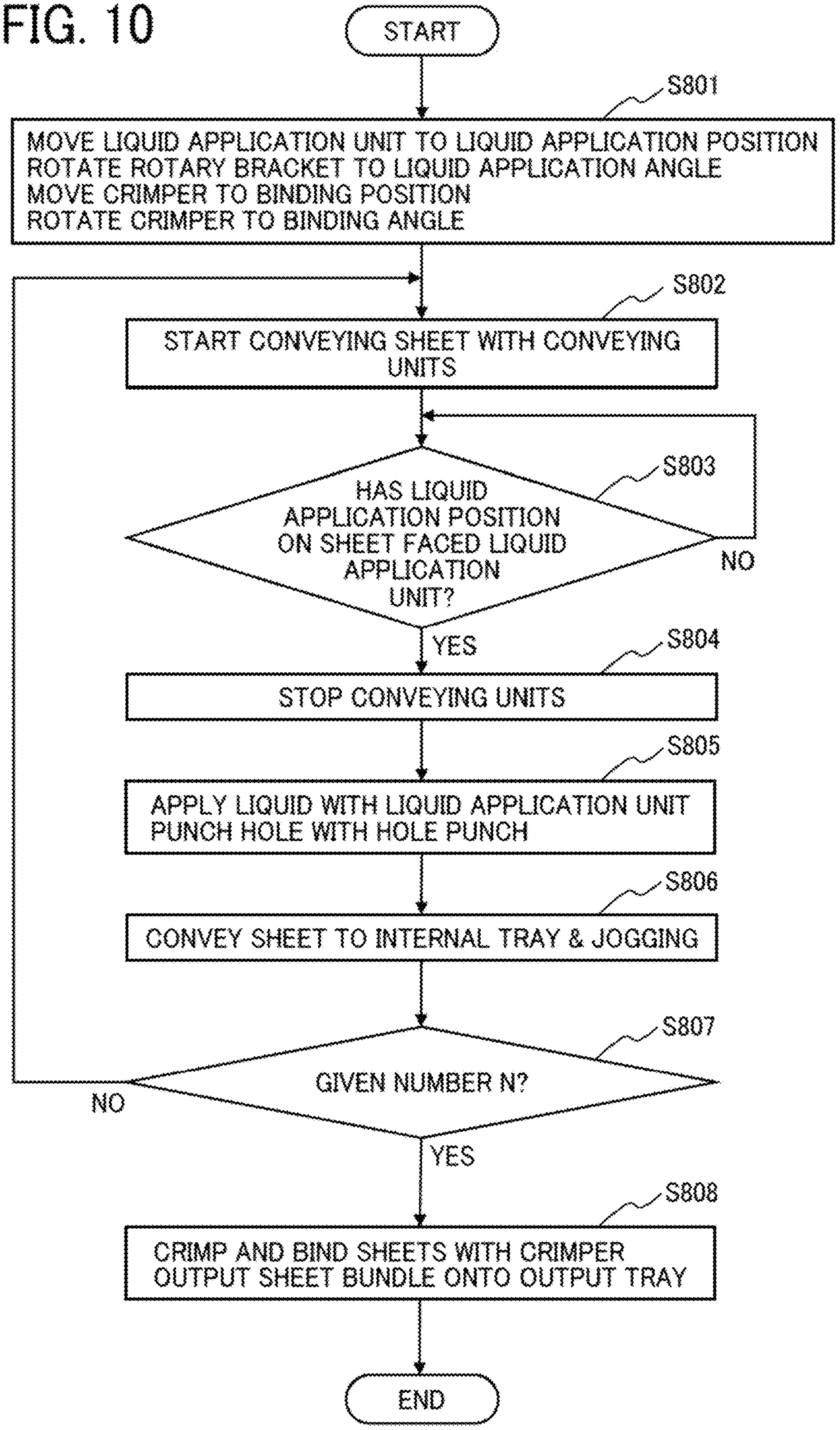
FIG. 10 is a flowchart of post-processing performed by the post-processing apparatus of FIG. 2.

FIG. 10 is a flowchart of post-processing.

Specifically, FIG. 10 is a flowchart of a process to execute the one-point binding illustrated in FIGS. 3A to 3C. For example, the controller 100 executes the post-processing illustrated in FIG. 10 when the controller 100 acquires an instruction to execute the post-processing from the image forming apparatus 2. In the following description, the instruction to execute the post-processing may be referred to as a "post-processing command." The post-processing command includes, for example, the number of sheets P of the sheet bundle Pb, the binding position B1 (i.e., the liquid application position B1), a binding angle (i.e., a liquid application angle), and a process that is executed in parallel with the liquid application process (i.e., punching a hole in the present embodiment). In the following description, the number of sheets P of the sheet bundle Pb may be referred to as a "given number N." Note that, at the start of the post-processing, the liquid application unit 40 is at the standby position whereas the rotary bracket 42 is held at the standby angle.

First, in step S801, the controller 100 drives the liquid applier movement motor 37 to move the liquid application unit 40 in the main scanning direction such that liquid application head 46 moves from the standby position HP to a position where the liquid application head 46 can face the liquid application position B1 corresponding to the binding position B1 illustrated in FIGS. 3B and 3C. In addition, in step S801, the controller 100 drives the rotary motor 50 to rotate the rotary bracket 42 such that the liquid application head 46 rotates from the standby angle to the liquid application angle. It is ascertained based on a pulse signal output from a rotary encoder of the liquid applier movement motor 37 that the liquid application head 46 has reached the position where the liquid application head 46 can face the liquid application position B1. Similarly, it is ascertained based on a pulse signal output from a rotary encoder of the rotary motor 50 that the liquid application head 46 has reached the liquid application angle. Further, in step S801, the controller 100 drives the crimper movement motor 138 to move the crimper 25 from the standby position HP to the position where the crimper 25 can face the binding position B1 as illustrated in FIGS. 3A and 3B. Furthermore, in step S801, the controller 100 drives the pivot motor 139 to rotate the crimper 25 from the standby angle to the binding angle, which may be referred to as a crimp binding angle in the following description. It is ascertained based on a pulse signal output from a rotary encoder of the crimper movement motor 138 that the crimper 25 has reached the position where the crimper 25 can face the binding position B1. Similarly, it is ascertained based on a pulse signal output from a rotary encoder of the pivot motor 139 that the crimper 25 has reached the crimp binding angle.

Subsequently, in step S802, the controller 100 drives the conveyance roller pairs 10 and 11 to start conveying the sheet P on which an image is formed by the image forming apparatus 2. In step S803, the controller 100 determines whether the liquid application position B1 on the sheet P has faced the liquid application unit 40 (more specifically, the liquid application head 46). When the liquid application position B1 on the sheet P has not faced the liquid application head 46 (NO in step S803), the controller 100 repeats the determination in step S803. In other words, the controller 100 continues driving the conveyance roller pairs 10 and 11 until the liquid application position B1 on the sheet P faces the liquid application head 46. By contrast, when the liquid application position B1 on the sheet P has faced the liquid application head 46 (YES in step S803), in step S804, the controller 100 stops the conveyance roller pairs 10 and 11. It is ascertained based on a pulse signal output from a rotary encoder of a motor that drives the conveyance roller pairs 10 and 11 that the liquid application position B1 on the sheet P has faced the liquid application head 46.

In step S805, the controller 100 executes the process of applying the liquid to the liquid application position B1 on the sheet P with the liquid applier 31 and the process of punching a hole in the sheet P with the hole punch 32 in parallel. More specifically, the controller 100 rotates the movement motor 51 in the first direction to bring the liquid application head 46 into contact with the liquid application position B1 on the sheet P. In addition, the controller 100 changes the pressing force of the liquid application head 46 (in other words, the amount of rotation of the movement motor 51) depending on the amount of liquid that is applied to the sheet P.

The amount of liquid that is applied to the sheet P may be the same for all the sheets P of the sheet bundle Pb or may be different for each sheet P. For example, the controller 100 may apply a decreased amount of liquid to the sheet P conveyed later. The amount of rotation of the movement motor 51 may be ascertained based on a pulse signal output from a rotary encoder of the movement motor 51.

Subsequently, in step S806, the controller 100 drives the conveyance roller pairs 10, 11, 14, and 15 to place the sheet P on the internal tray 22. In addition, in step S806, the controller 100 moves the side fences 24L and 24R to align the position of the sheet bundle Pb placed on the internal tray 22 in the main scanning direction. In short, the controller 100 performs so-called jogging.

Subsequently, in step S807, the controller 100 determines whether the number of sheets P that are placed on the internal tray 22 has reached the given number N instructed by the post-processing command. When the controller 100 determines that the number of sheets P that are placed on the internal tray 22 has not reached the given number N (NO in step S807), the controller 100 executes the operations of steps S802 to S806 again.

By contrast, when the controller 100 determines that the number of sheets P that are placed on the internal tray 22 has reached the given number N (YES in step S807), in step S808, the controller 100 causes the crimper 25 to crimp and bind the binding position B1 (i.e., the liquid application position B1) on the sheet bundle Pb to which the liquid has been applied by the liquid applier 31. In addition, in step S808, the controller 100 rotates the conveyance roller pair 15 to output the sheet bundle Pb thus crimped and bound to the output tray 26.

A description is now given of some or all of the advantages according to the embodiment described above, enumeration of which is not exhaustive or limiting.

Although pressure teeth to which a high load is applied are provided with fine liquid supply holes that may cause, for example, a change in surface characteristics, a decrease in durability, clogging, or rust in some typical crimpers, the embodiment described above obviates the need to provide such liquid supply holes in the binding teeth 25*a* and 25*b*. Thus, the embodiment described above simplifies the configuration of the binding teeth 25*a* and 25*b* and obviates the need to make the binding teeth 25*a* and 25*b* of expensive materials to prevent such unfavorable outcomes caused by the liquid supply holes. As a result, the embodiment described above attains cost reduction.

In some typical medium processing apparatuses, a liquid applier and a binder are often placed side by side on a single plate together with an assembly that moves the liquid applier in conjunction with an operation of the binder according to the variations of binding processes such as corner oblique binding, parallel one-point binding, and parallel two-point binding. In short, the binder has a complicated mechanism in increased size.

As compared with such medium processing apparatuses in which the liquid applier and the crimper (i.e., binder) are placed side by side on a single plate, the liquid applier 31 and the crimper 25 are smaller and simpler in configuration, without considering the convenience of the layout, according to the embodiment described above.

To obtain a sufficient binding force, the liquid is preferably applied to each sheet.

In some typical medium processing apparatuses, a liquid applier and a binder are disposed so as to process the sheet conveyed to an internal tray. To apply the liquid to each sheet, the sheets have to be conveyed one by one to the internal tray. Such medium processing apparatuses may temporarily convey two or three sheets in a stacked manner to a storage tray before conveying the sheets to the internal tray. In short, such medium processing apparatuses perform so-called pre-stacking to shorten the processing time and increase productivity. However, in such medium processing apparatuses, the liquid is not applied to each sheet when the sheets are pre-stacked. When the sheets are not pre-stacked to apply the liquid to each sheet, the productivity of the binder decreases.

By contrast, according to the embodiment described above, the liquid is applied to the sheet P upstream from the internal tray 22 in the conveyance direction. For example, on the conveyance passage from the liquid applier 31 to the internal tray 22, a plurality of sheets P to which the liquid has been applied may be stacked and then conveyed to the internal tray 22. In short, the plurality of sheets P may be pre-stacked to enhance the productivity of the post-processing apparatus 3, specifically, the productivity of the binding process that is performed by the crimper 25.

Further, the embodiment described above obviates the need to provide, separately from the liquid applier 31, a liquid applier that is dedicated to the saddle binder 28 to allow the saddle binder 28 to bind the sheets P to which the liquid has been applied. In short, the post-processing apparatus 3 is simplified in configuration and attains cost reduction.

According to the embodiment described above, the liquid is applied to the sheet P in parallel with the hole punching in the sheet P. Thus, the productivity of the post-processing apparatus 3 is enhanced, as compared with a case where the liquid application is executed alone. In addition to or instead of the hole punching in the sheet P, the inclination of the sheet P may be corrected in parallel with the liquid application for the sheet P.

According to the embodiment described above, before the conveyance roller pairs 10 and 11 start conveying the sheet P, for example, while the image forming apparatus 2 forms an image, the liquid application unit 40 stands by at a position where the liquid application unit 40 can face the liquid application position B1 on the sheet P. Accordingly, the productivity of the post-processing apparatus 3 is enhanced as compared with a case where the liquid application unit 40 is moved after the sheet P stops at a position where the sheet P faces the liquid application head 46.

According to the embodiment described above, the amount of liquid that is applied is adjusted for each sheet P. Thus, a uniform amount of liquid is applied to the sheets P of the sheet bundle Pb.

Accordingly, the strength of the crimp binding is enhanced.

Now, a description is given of a first modification of the embodiment described above.

Figure 11A:
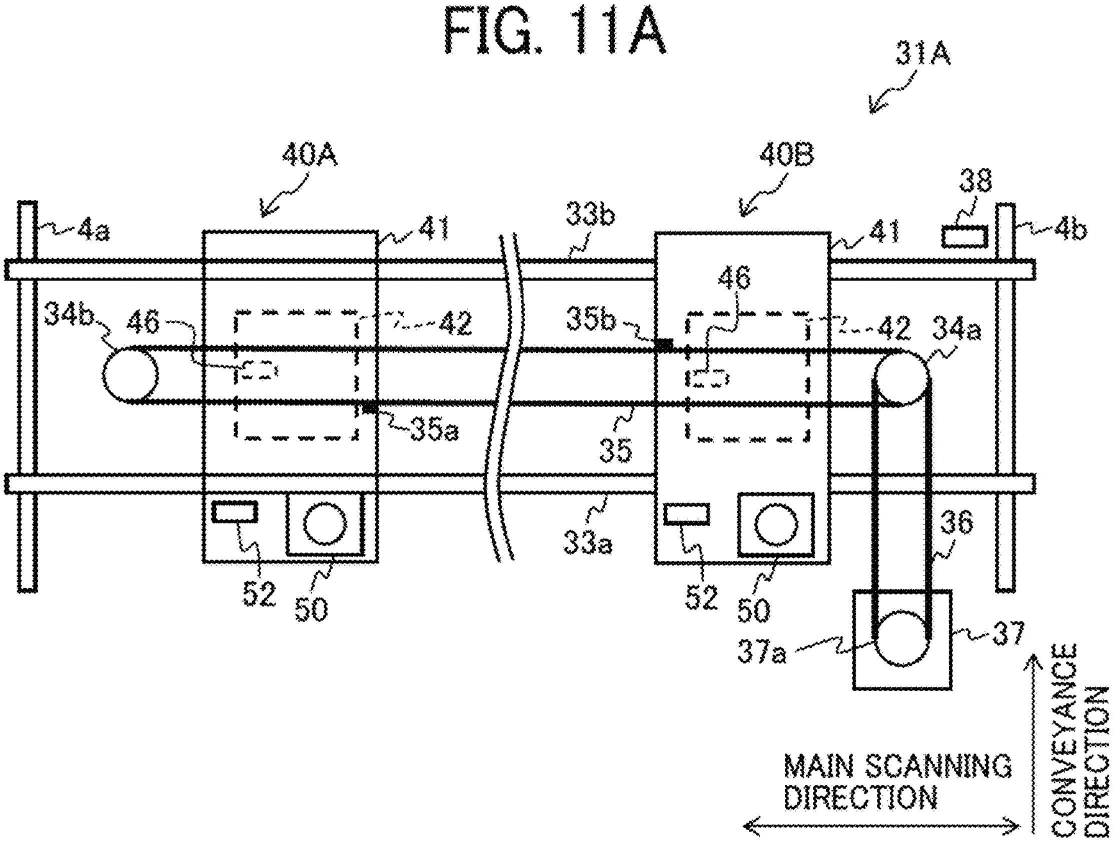
FIGS. 11A and 11B are views of a liquid applier in a thickness direction of a sheet, according to a first modification of the above embodiment of the present disclosure.
Figure 11B:
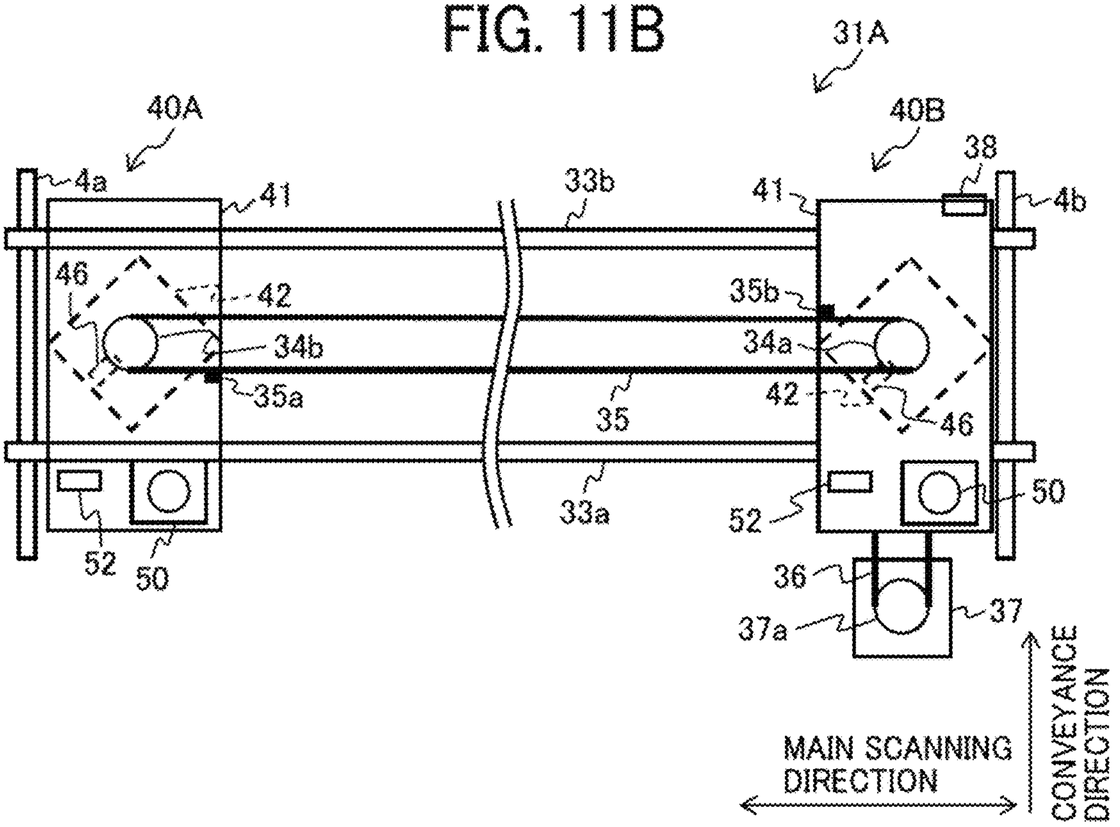

Each of FIGS. 11A and 11B is a view of a liquid applier 31A in the thickness direction of the sheet P, according to the first modification.

Note that detailed descriptions will be omitted of common features of the embodiment described above and the present modification. The following description concentrates on the differences between the embodiment described above and the present modification. The liquid applier 31A of the first modification is like the liquid applier 31 of the embodiment described above, except that the liquid applier 31A includes a plurality of liquid application units 40A and 40B.

Each of the liquid application units 40A and 40B has a configuration like the configuration of the liquid application unit 40 according to the embodiment described above. The liquid application units 40A and 40B are apart from each other in the main scanning direction and supported by the pair of guide shafts 33*a* and 33*b*. The liquid application units 40A and 40B are coupled to the endless annular belt 35 by connections 35*a* and 35*b*, respectively. More specifically, the liquid application units 40A and 40B are preferably connected by connections 35*a* and 35*b*, respectively, to opposite portions of the endless annular belt 35 at positions symmetrical in the main scanning direction with respect to the center of the sheet P. Note that the opposite portions of the endless annular belt 35 move in opposite directions along the circumference of the endless annular belt 35.

As in the first modification, the plurality of liquid application units 40A and 40B apply liquid to the sheet P for two-point binding, without reducing the producibility of the post-processing apparatus 3. Although the liquid applier 31A includes two liquid application units 40A and 40B, the number of liquid application units 40 included in the liquid applier 31A is not limited to two. The number of liquid application units 40 included in the liquid applier 31A may be three or more.

In many cases, the liquid application positions for the two-point binding are symmetrical in the main scanning direction with respect to the center of the sheet P. In the present modification, since the two liquid application units 40A and 40B are attached to the opposite portions of the endless annular belt 35 at the positions symmetrical in the main scanning direction with respect to the center of the sheet P, the two liquid application units 40A and 40B are moved in conjunction with each other by the single liquid applier movement motor 37.

Now, a description is given of a second modification of the embodiment described above.

Figure 12A:
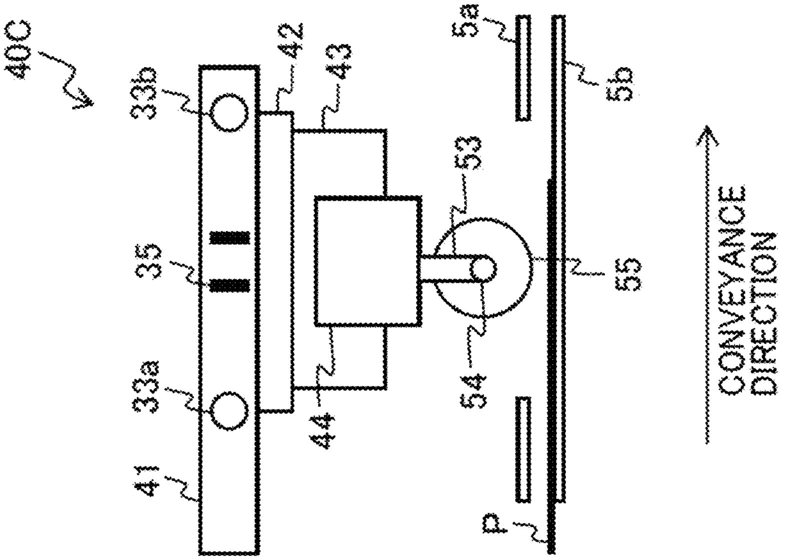
FIGS. 12A and 12B are cross-sectional views of a liquid application unit taken along a conveyance direction, according to a second modification of the above embodiment of the present disclosure.
Figure 12B:
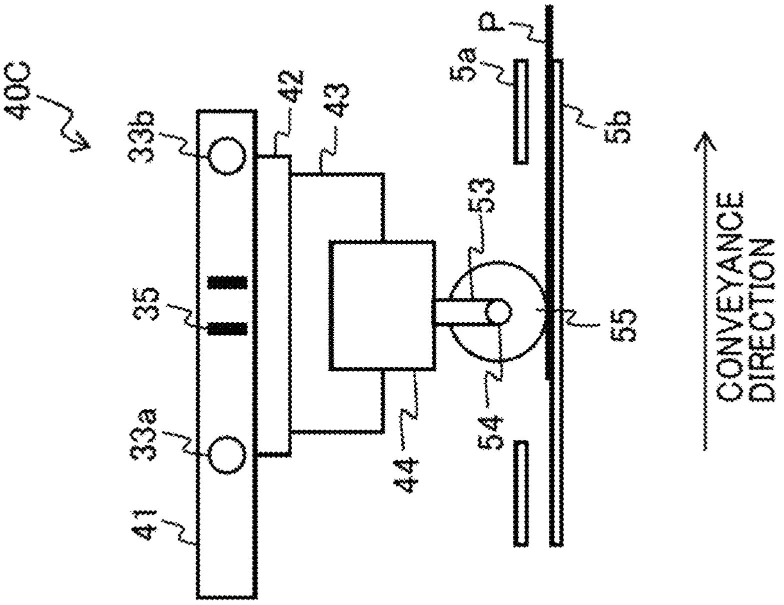

Each of FIGS. 12A and 12B is a cross-sectional view of a liquid application unit 40C taken along the conveyance direction, according to the second modification.

Note that detailed descriptions will be omitted of common features of the embodiment described above and the present modification. The following description concentrates on the differences between the embodiment described above and the present modification. The liquid application unit 40C of the second modification is like the liquid application unit 40 of the embodiment described above, except that the liquid application unit 40C includes a liquid application roller 55 serving as a liquid application rotator, instead of the liquid application head 46.

According to the second modification, the liquid application unit 40C includes an arm 53, a pivot 54, and the liquid application roller 55. The arm 53 projects downward from the mover 44. The pivot 54 extends in the main scanning direction at an end of the arm 53. The liquid application roller 55 is rotatably supported by the pivot 54. The liquid stored in the liquid storage tank 43 is supplied to the liquid application roller 55.

The controller 100 rotates the movement motor 51 in the first direction to bring the liquid application roller 55 into contact with the sheet P conveyed by the conveyance roller pairs 10 and 11. As the sheet P is conveyed by the conveyance roller pairs 10 and 11 while being in contact with the liquid application roller 55, the liquid application roller 55 is rotated. Thus, the liquid is applied from the liquid application roller 55 to the sheet P. In response to the liquid application position passing through the liquid application roller 55, the controller 100 rotates the movement motor 51 in the second direction to separate the liquid application roller 55 from the sheet P.

According to the second modification, the liquid is applied without stopping the conveyance of the sheet P. Accordingly, the productivity of the post-processing apparatus 3 is further enhanced.

The control method described above may be implemented by, for example, a program. In other words, the control method is executed by a computer that causes an arithmetic device, a storage device, an input device, an output device, and a control device to operate in cooperation with each other based on a program. The program may be written in, for example, a storage device or a storage medium and distributed. Alternatively, the program may be distributed through, for example, an electric communication line.

Now, a description is given of some aspects of the present disclosure.

Initially, a description is given of a first aspect.

A medium processing apparatus includes a conveyor, a receptacle, a liquid applier, and a crimper. The conveyor conveys a medium.

The receptacle holds a plurality of media, including the medium, conveyed by the conveyor.

The liquid applier is disposed upstream from the receptacle in a conveyance direction of the medium to apply liquid to a liquid application position on the medium conveyed by the conveyor.

The crimper presses and deforms the liquid application position on the plurality of media held on the receptacle to bind the plurality of media.

Now, a description is given of a second aspect.

In the medium processing apparatus according to the first aspect, the liquid applier is positioned to face the liquid application position when the conveyor temporarily stops conveying the medium.

Now, a description is given of a third aspect.

The medium processing apparatus according to the first or second aspect, further includes a processor that executes a process to correct an inclination of the medium or a process to punch a hole penetrating the medium in a thickness direction of the medium, in parallel with a liquid application process performed by the liquid applier, when the conveyor temporarily stops conveying the medium.

Now, a description is given of a fourth aspect.

In the medium processing apparatus according to any one of the first to third aspects, the liquid applier moves in a main scanning direction orthogonal to the conveyance direction of the medium and to a thickness direction of the medium and stands by at a position where the liquid applier faces the liquid application position before the conveyor starts conveying the medium.

Now, a description is given of a fifth aspect.

In the medium processing apparatus according to any one of the first to fourth aspects, the liquid applier includes a plurality of liquid application units that are apart from each other in a main scanning direction orthogonal to the conveyance direction of the medium and to a thickness direction of the medium and movable in the main scanning direction.

Now, a description is given of a sixth aspect.

In the medium processing apparatus according to any one of the first to fifth aspects, the liquid applier can adjust an amount of the liquid to be applied to each of the plurality of media conveyed by the conveyor.

Now, a description is given of a seventh aspect.

In the medium processing apparatus according to the sixth aspect, wherein the liquid applier includes a liquid application member that contacts the medium and separates from the medium. The liquid applier changes a pressing force of the liquid application member against the medium to adjust the amount of the liquid to be applied.

Now, a description is given of an eighth aspect.

In the medium processing apparatus according to any one of the first to seventh aspects, the liquid applier includes a liquid application rotator that rotates, in contact with the medium conveyed by the conveyor, about a pivot extending in a main scanning direction orthogonal to the conveyance direction of the medium and to a thickness direction of the medium, to apply the liquid to the medium.

Now, a description is given of a ninth aspect.

An image forming system includes an image forming apparatus and the medium processing apparatus according to the first to eighth aspects. The image forming apparatus includes an image forming device that forms an image on the medium.

Now, a description is given of a tenth aspect.

An image forming system includes an image forming apparatus, a medium processing apparatus, and an intermediate apparatus. The image forming apparatus forms an image on a medium. The medium processing apparatus processes the medium on which the image is formed by the image forming apparatus. The medium processing apparatus includes a conveyor, a receptacle, and a crimper. The conveyor conveys the medium. The receptacle holds the medium conveyed by the conveyor. The crimper presses and deforms a liquid application position on a plurality of media including the medium held on the receptacle to bind the plurality of media. The intermediate apparatus is interposed between a medium output portion of the image forming apparatus and the medium processing apparatus in a conveyance course of the medium. The intermediate apparatus includes a liquid applier disposed upstream from the receptacle in a conveyance direction of the medium to apply liquid to the liquid application position on the medium conveyed from the image forming apparatus.

According to one aspect of the present disclosure, a medium processing apparatus that performs the crimp binding after applying liquid to a plurality of sheets as a sheet bundle includes a binder having a configuration simplified to enhance the productivity of the binding process.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. It is therefore to be understood that the disclosure of this patent specification may be practiced otherwise by those skilled in the art than as specifically described herein and such modifications and alternatives are within the technical scope of the appended claims.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A medium processing apparatus comprising:

a conveyor configured to convey a medium in a conveyance direction;

a liquid applier configured to apply liquid to a liquid application position on the medium conveyed by the conveyor; and a crimper configured to press and deform the liquid application position on a plurality of media including the medium to bind the plurality of media, wherein the liquid applier includes a liquid application rotator configured to rotate, in contact with the medium conveyed by the conveyor, about a pivot extending in a main scanning direction orthogonal to the conveyance direction of the medium and to a thickness direction of the medium, to apply the liquid to the medium.

2. The medium processing apparatus according to claim 1, wherein the liquid applier is positioned to face the liquid application position when the conveyor temporarily stops conveying the medium.

3. The medium processing apparatus according to claim 1, further comprising a processor configured to execute a process to correct an inclination of the medium or a process to punch a hole penetrating the medium in the thickness direction of the medium, in parallel with a liquid application process performed by the liquid applier, when the conveyor temporarily stops conveying the medium.

4. The medium processing apparatus according to claim 1, wherein the liquid applier is configured to move in the main scanning direction and stand by at a position where the liquid applier faces the liquid application position before the conveyor starts conveying the medium.

5. The medium processing apparatus according to claim 1, wherein the liquid applier includes a plurality of liquid application units apart from each other in the main scanning direction and movable in the main scanning direction.

6. The medium processing apparatus according to claim 1, wherein the liquid applier is configured to adjust an amount of the liquid to be applied to each of the plurality of media conveyed by the conveyor.

7. The medium processing apparatus according to claim 6, wherein the liquid applier includes a liquid application member configured to contact the medium and separate from the medium, and wherein the liquid applier is configured to change a pressing force of the liquid application member against the medium to adjust the amount of the liquid to be applied.

8. An image forming system comprising:

an image forming apparatus configured to form an image on a medium; and the medium processing apparatus according to claim 1.

* * * * *